United States Patent
Unno et al.

(10) Patent No.: US 10,495,258 B2
(45) Date of Patent: Dec. 3, 2019

(54) LIQUEFIED HYDROGEN LOADING ARM AND LIQUEFIED HYDROGEN TRANSPORT METHOD

(71) Applicant: KAWASAKI JUKOGYO KABUSHIKI KAISHA, Kobe-shi, Hyogo (JP)

(72) Inventors: Shuntaro Unno, Kobe (JP); Tomonori Takase, Kakogawa (JP); Tomoaki Umemura, Kobe (JP); Akihiko Inomata, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 81 days.

(21) Appl. No.: 15/743,801

(22) PCT Filed: Jul. 12, 2016

(86) PCT No.: PCT/JP2016/003305
§ 371 (c)(1),
(2) Date: Jan. 11, 2018

(87) PCT Pub. No.: WO2017/010095
PCT Pub. Date: Jan. 19, 2017

(65) Prior Publication Data
US 2018/0202608 A1 Jul. 19, 2018

(30) Foreign Application Priority Data
Jul. 15, 2015 (JP) .................. 2015-140973

(51) Int. Cl.
*B67D 9/02* (2010.01)
*F17C 7/02* (2006.01)
(Continued)

(52) U.S. Cl.
CPC .............. *F17C 7/02* (2013.01); *B67D 9/02* (2013.01); *F17C 9/00* (2013.01); *F17C 13/028* (2013.01);
(Continued)

(58) Field of Classification Search
CPC .. B67D 9/00; B67D 9/02; B63B 27/24; B63B 27/25
(Continued)

(56) References Cited

U.S. PATENT DOCUMENTS

| 2,818,891 A | 1/1958 | Loeser | |
|---|---|---|---|
| 4,899,776 A * | 2/1990 | Le Devehat | B67D 9/02 137/15.07 |

(Continued)

FOREIGN PATENT DOCUMENTS

| JP | 2561667 Y2 | 2/1998 |
|---|---|---|
| JP | 2006-168781 A | 6/2006 |
| JP | 2012-163129 A | 8/2012 |

*Primary Examiner* — Marina A Tietjen
*Assistant Examiner* — Paul J Gray
(74) *Attorney, Agent, or Firm* — Oliff PLC

(57) ABSTRACT

A liquefied hydrogen transport method includes connecting first and second loading arms to the manifold while vacuum insulation double tubes of the first and second loading arms are filled with hydrogen gas and air is mixed in piggyback lines; supplying an inactive gas to one of the piggyback lines of the first and second loading arms and taking in a gas mixture of an inactive gas and air from the other of the piggyback lines of the first and second loading arms; supplying hydrogen gas to one of the piggyback lines of the first and second loading arms and taking in a gas mixture of hydrogen gas and an inactive gas from the other of the piggyback lines of the first and second lading arms; and (Continued)

transporting liquefied hydrogen through any one of the vacuum insulation double tubes of the first and second loading arms.

6 Claims, 22 Drawing Sheets

(51) Int. Cl.
*F17C 9/00* (2006.01)
*F17C 13/02* (2006.01)

(52) U.S. Cl.
CPC ............. *F17C 2201/0109* (2013.01); *F17C 2203/0391* (2013.01); *F17C 2205/0323* (2013.01); *F17C 2221/012* (2013.01); *F17C 2223/0123* (2013.01); *F17C 2223/0161* (2013.01)

(58) Field of Classification Search
USPC .......................................... 141/382; 441/4, 5
See application file for complete search history.

(56) References Cited

U.S. PATENT DOCUMENTS

| | | | |
|---|---|---|---|
| 2013/0312871 A1 | 11/2013 | Hoffjann et al. | |
| 2014/0034137 A1* | 2/2014 | Kelly | B63B 27/24 137/1 |

* cited by examiner

View showing state after air purging by $N_2$ gas

View showing state at time of liquid pushing

LIQUEFIED HYDROGEN LOADING ARM AND LIQUEFIED HYDROGEN TRANSPORT METHOD

TECHNICAL FIELD

The present invention relates to a liquefied hydrogen loading arm and a liquefied hydrogen transport method.

BACKGROUND ART

Loading arms are usually used to load and unload fossil fuels such as crude oil, gasoline, light oil, and natural gases (LNG and LPG) between fossil fuel transport ships and storage tanks on the land. A general loading arm includes, as a support structure, an outer riser erected on the land, an inboard boom pivotally supported on the top portion of the outer riser, an outboard boom having an upper end portion pivotally connected to the upper end portion of the inboard boom, a counterweight mounted on the lower end side of the inboard boom, and the like.

The loading arm also includes, as a fossil fuel transport tube, an inner riser disposed in the outer riser, an inboard arm connected to the inner riser through a swivel joint and disposed on the inboard boom, an outboard arm that has an upper end portion connected to the upper end portion of the inboard arm through the swivel joint and is supported by the outboard boom, an emergency release system (ERS) connected to the lower end portion of the outboard arm through the swivel joint, and a joint portion connected to the ERS through or not through the swivel joint.

A loading arm is also used to transport fossil fuel between a storage tank on the land and a tank track.

Patent literature 1 discloses a loading arm that is used to transport LNG or the like between a tank track and a storage tank, and uses a single-tube flexible pipe. This loading arm includes a gantry, an inboard boom supported on the gantry, an outboard boom connected to the distal end portion of the inboard boom, a rotary joint connected to the lower end of the outboard boom, a track connecting boom supported by the rotary joint, a flexible pipe for the transportation of LNG or the like, which is disposed in a space above the inboard boom and the outboard boom, has a top portion supported on a flexible base of a connecting portion between the inboard boom and the outboard boom, and has a distal end portion supported on the distal end portion of the track connecting arm, and the like.

The liquefied gas receiving loading arm disclosed in patent literature 2 is provided with a liquid receiving tube connected to the loading arm, a liquid draining line branching from the liquid receiving tube, a liquid draining automatic valve provided in the liquid draining line, an inactive gas blowing tube connected to a midway portion of the loading arm, an inactive gas blowing automatic valve provided in the inactive gas blowing tube, first and second automatic valves interposed in a bypass line for bypassing the liquid draining automatic valve of the liquid draining line, a gas detector, and the like, and is configured to automatically perform the gas replacing operation of replacing a gas in the loading arm with an inactive gas.

CITATION LIST

Patent Literature

PTL 1: Japanese Laid-Open Patent Application No. 2006-168781

PTL 2: Japanese Utility Model Registration No. 2561667

SUMMARY OF INVENTION

Technical Problem

Liquefied hydrogen is a cryogenic fluid cooled to −253° C. In order to prevent the evaporation of this fluid and the generation of liquefied air and solid air, a vacuum insulation double tube with high thermal insulation performance needs to be used. A conventional LNG loading arm includes a plurality of swivel joints, and existing LNG swivel joints cannot be applied to liquefied hydrogen. This makes it necessary to develop a swivel joint for a vacuum insulation double tube, the swivel joint having a special structure.

The flexible pipe of the loading arm disclosed in patent literature 1 is a single tube, and hence cannot be used for loading liquefied hydrogen. When a flexible vacuum insulation double tube is to be used in place of the above flexible pipe, the flexible pipe is disposed in a space on the upper side of the loading arm, and hence needs to have a long length. In addition, since the unit weight of the double tube becomes larger than that of a flexible pipe having a single-tube structure, a support structure for supporting the vacuum insulation double tube becomes complex, resulting in an increase in facility cost.

The liquefied gas receiving loading arm disclosed in patent literature 2 is based on the premise that liquefied gas in the loading arm is replaced with an inactive gas. When, however, the liquefied hydrogen loading arm is filled with an inactive gas, the inactive gas in the loading arm needs to be replaced with hydrogen gas at the time of the transportation of liquefied hydrogen.

Assume that a flexible vacuum insulation double tube is used for a liquefied hydrogen loading arm. In this case, when the gas in the vacuum insulation double tube is replaced with an inactive gas or hydrogen gas, since the inner surface of the inner tube of the vacuum insulation double tube has many annular corrugations, it takes much time for gas replacement as compared with a general steel tube. In addition, replacement requires a large amount of gas.

Since liquefied hydrogen is a cryogenic fluid cooled to −253° C., in particular, inexpensive nitrogen gas cannot be used for purging in a cryogenic state. That is, expensive hydrogen gas, expensive helium gas in some cases, needs to be used for purging.

An object of the present invention is to provide a liquefied hydrogen loading arm configured to support a flexible vacuum insulation double tube for the transportation of liquefied hydrogen with a support frame structure and a liquefied hydrogen transport method capable of efficiently performing gas replacement before and after the transportation of liquefied hydrogen by the loading arm.

Solution to Problem

A liquefied hydrogen loading arm according to an aspect of the present invention is a liquefied hydrogen loading arm configured to transport liquefied hydrogen. The loading arm includes a loading arm support frame structure including a base riser erected on a ground, an inboard boom, an outboard boom, and a counterweight attached to a proximal end portion of the inboard boom, a flexible vacuum insulation double tube including a metal inner tube, a metal outer tube, and an insulation vacuum layer, disposed in a space below the support frame structure, and supported by the support frame structure, a vacuum insulation double connecting tube connected to a distal end portion of the vacuum insulation double tube and connected to a distal end portion of the outboard boom, an arm-side opening/closing valve and an emergency release system sequentially interposed in the vacuum insulation double connecting tube from a vacuum insulation double tube side, and a flexible piggyback line disposed along the vacuum insulation double tube, having a proximal end portion configured to be selectively connected to an inactive gas tubing and a hydrogen gas tubing on a land through a land-side opening/closing valve, and having a distal end portion connected to the vacuum insulation double connecting tube between the arm-side opening/closing valve and the emergency release system.

According to the above arrangement, the use of the flexible vacuum insulation double tube for the transportation of liquefied hydrogen will eliminate the need to provide any swivel joints. Since the vacuum insulation double tube is disposed below the support frame structure, the length of the vacuum insulation double tube can be set to a minimum necessary length. This can simplify a structure for supporting the vacuum insulation double tube and achieve a reduction in facility cost.

In addition, since the piggyback line is provided, an inactive gas and hydrogen gas can be supplied/taken in through the piggyback line. This makes it possible to eliminate the need to perform gas replacement with respect to the vacuum insulation double tube and reduce the volume of tubing requiring purging. This can shorten the time required for purging and achieve a reduction in gas amount.

A liquefied hydrogen transport method according to an aspect of the present invention is a liquefied hydrogen transport method of transporting liquefied hydrogen with two of the first and second liquefied hydrogen loading arms, the first and second liquefied hydrogen loading arms being arranged side by side and configured to be connected/cut off to/from each other through a manifold of a liquefied hydrogen transport ship while being connected to the manifold. The method includes a first step of connecting the first and second loading arms to the manifold while vacuum insulation double tubes of the first and second loading arms are filled with hydrogen gas and air is mixed in piggyback lines, a second step of supplying an inactive gas to one of the piggyback lines of the first and second loading arms and taking in a gas mixture of an inactive gas and air from the other of the piggyback lines of the first and second loading arms, a third step of supplying hydrogen gas to one of the piggyback lines of the first and second loading arms and taking in a gas mixture of hydrogen gas and an inactive gas from the other of the piggyback lines of the first and second lading arms, and a fourth step of transporting liquefied hydrogen through any one of the vacuum insulation double tubes of the first and second loading arms.

According to the above method, effectively using the piggyback lines of the first and second loading arms makes it possible to supply a gas to replace and taken in a gas to be replaced and at the same time safely transport liquefied hydrogen while preventing the contact between air and liquefied hydrogen and the contact between an inactive gas and liquefied hydrogen. Since there is no need to supply any gas for purging to the vacuum insulation double tubes of the first and second loading arms, it is possible to keep the purity of liquefied hydrogen as a product high.

This method may include a fifth step of, after the fourth step, taking in liquefied hydrogen and hydrogen gas through the vacuum insulation double tubes of the first and second loading arms while supplying hydrogen gas to one of the piggyback lines of the first and second loading arms.

According to the above method, in the fifth step following the fourth step, liquefied hydrogen in the vacuum insulation double tubes of the first and second loading arms and the tubings of the manifold can be completely replaced with hydrogen gas.

This method may include a sixth step of, after the fifth step, supplying an inactive gas to one of the piggyback lines of the first and second loading arms, taking in hydrogen gas and an inactive gas from the other of piggyback lines of the first and second loading arms, and replacing a gas in the piggyback lines of the first and second loading arms with an inactive gas.

According to the above method, in the sixth step following the fifth step, a gas in the piggyback lines of the first and second loading arms can be replaced with an inactive gas.

This method may include a seventh step of, after the sixth step, separating the first and second loading arms from the manifold and mixing air in the piggyback lines of the first and second loading arms while the vacuum insulation double tubes of the first and second loading arms are filled with hydrogen gas.

According to the above method, in the seventh step following the sixth step, when the first and second loading arms are connected to the manifold of the ship next time, air is mixed in the piggyback lines while the vacuum insulation double tubes are filled with hydrogen gas without performing gas replacement or the like. This makes it possible to smoothly start the first step.

A liquefied hydrogen transport method according to another embodiment of the present invention is a method of transporting liquefied hydrogen with at least two of first and second liquefied hydrogen loading arms, the first and second liquefied hydrogen loading arms being arranged side by side, and having piggyback lines configured to be connected/cut off to/from a connecting tubing provided on a land through an opening/closing valve interposed in the connecting tubing. The method includes a first step of connecting the first and second loading arms to the connecting tubing while vacuum insulation double tubes of the first and second loading arms are filled with hydrogen gas and air is mixed in the piggyback lines, a second step of supplying an inactive gas to one of the piggyback lines of the first and second loading arms and taking in a gas mixture of an inactive gas and air from the other of the piggyback lines of the first and second loading arms, a third step of supplying hydrogen gas from one of the piggyback lines of the first and second loading arms and taking in a gas mixture of hydrogen gas and an inactive gas from the other of the piggyback lines of the first and second lading arms, and a fourth step of transporting liquefied hydrogen through any one of the vacuum insulation double tubes of the first and second loading arms.

The above method can obtain almost the same effects as those of the liquefied hydrogen transport method according to the above aspect.

Advantageous Effects of Invention

The present invention can provide a liquefied hydrogen loading arm configured to support a flexible vacuum insulation double tube for the transportation of liquefied hydrogen with a support frame structure and a liquefied hydrogen transport method capable of efficiently performing gas replacement before and after the transportation of liquefied hydrogen by the loading arm.

BRIEF DESCRIPTION OF DRAWINGS

FIG. 14 is a view showing a state of the plumbing of the first and second loading arms after connection.

FIG. 15 is a view showing a state of the plumbing of the first and second loading arms after air purging by nitrogen gas.

FIG. 16 is a view showing a state of the plumbing of the first and second loading arms after nitrogen gas purging by hydrogen gas.

FIG. 17 is a view showing a state of the plumbing after pre-cooling.

FIG. 18 is a view showing a state of the plumbing at the time of cargo handling.

FIG. 19 is a view showing a state of the plumbing at the time of liquid pushing.

FIG. 20 is a view showing a state of the plumbing at the time of hotting up.

FIG. 21 is a view showing a state of the plumbing after hydrogen gas purging by $N_2$ gas.

FIG. 22 is a view showing a state of the plumbing after disconnection between the first and second loading arms.

DESCRIPTION OF EMBODIMENTS

Embodiments of the present invention will be described below.

Figure 1:
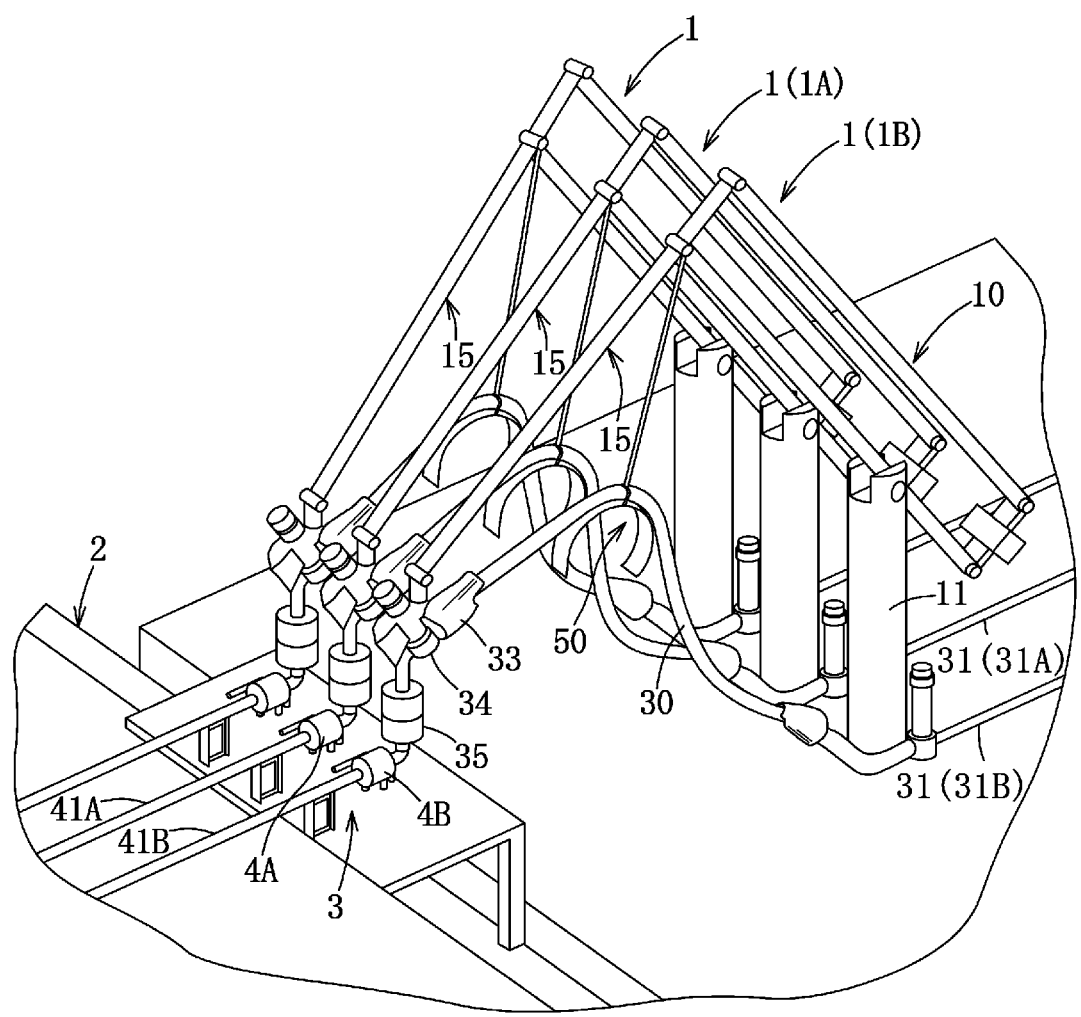
FIG. 1 is a schematic perspective view showing how a liquefied hydrogen loading arm according to a first embodiment is connected to a manifold of a liquefied hydrogen transport ship.

As shown in FIG. 1, a liquefied hydrogen loading arm 1 (to be referred to as a loading arm hereinafter) capable of transporting liquefied hydrogen is installed on the land near the quay of a liquefied hydrogen storage base at which a liquefied hydrogen transport ship 2 is docked, and is used to load and unload liquefied hydrogen between a low-temperature tank in the liquefied hydrogen transport ship 2 and a low-temperature tank for liquefied hydrogen storage.

Figure 2:
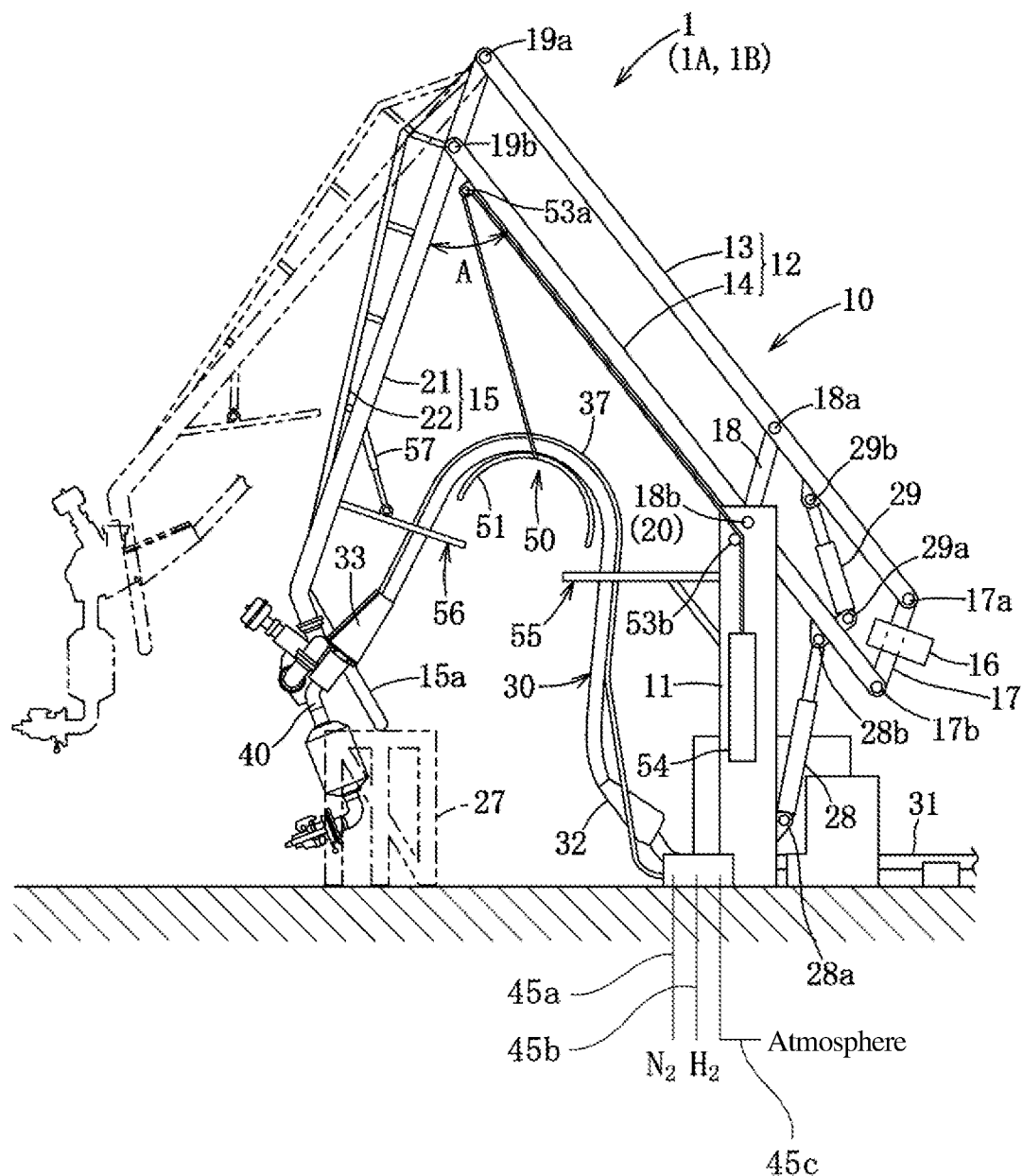
FIG. 2 is a side view of the loading arm.

As shown in FIGS. 1 and 2, the loading arm 1 includes a support frame structure 10, a flexible vacuum insulation double tube 30 supported by the support frame structure 10, a vacuum insulation double connecting tube 40 connected to the distal end portion of the vacuum insulation double tube 30, a midway portion support mechanism 50 that makes the support frame structure 10 support a lengthwise midway portion of the vacuum insulation double tube 30, and the like.

The support frame structure 10 includes a base riser 11 erected on the ground, an inboard boom 12 having a lengthwise midway portion connected to the upper end portion of the base riser 11 so as to be pivotable about a horizontal axis, an outboard boom 15 pivotally connected to the distal end portion of the inboard boom 12, and a counterweight 16 attached to the proximal end portion of the inboard boom 12.

The base riser 11 is a vertical columnar member, and has a connecting portion for connecting the inboard boom 12 on the upper end portion thereof. The inboard boom 12 includes two straight inclined frames 13 and 14 arranged parallel at an interval in the vertical direction, a proximal end connecting member 17 that connects the proximal end portions (lower end portions) of the inclined frames 13 and 14 through a pair of pin joint portions 17a and 17b having horizontal axes, and a midway connecting member 18 that connects the two inclined frames 13 and 14 with a pair of pin joint portions 18a and 18b having horizontal axes. The midway connecting member 18 is disposed near the proximal ends of the inclined frames 13 and 14. The distance from the pin joint portion 17a to the pin joint portion 17b is about ⅓ the distance from the pin joint portion 17a to a pin joint portion 19a.

The upper end portions of the two inclined frames 13 and 14 are connected to the outboard boom 15 with a pair of pin joint portions 19a and 19b having horizontal axes. The two inclined frames 13 and 14 constitute parallel links. The lower end portion of the midway connecting member 18 and a portion, which corresponds to the lower end portion, of the lower inclined frame 14 are hinged to the upper end portion (connecting portion) of the base riser 11 through a pivot shaft 20 so as to be pivotable about the horizontal axis.

The outboard boom 15 is obtained by integrally connecting a straight main frame 21 to a reinforcing member 22 that reinforces the main frame 21. The upper end portions of the two inclined frames 13 and 14 are connected to the upper end portion of the main frame 21 with the pair of pin joint portions 19a and 19b having horizontal axes.

In this case, when the upper inclined frame 13 is moved upward relative to the lower inclined frame 14, the pin joint portions 17a, 18a, and 19a move upward. Consequently, an opening angle A between the inboard boom 12 and the outboard boom 15 decreases, and the lower end portion of the outboard boom 15 moves toward the base riser 11. When the upper inclined frame 13 is moved in a direction opposite to the above direction, the opening angle increases. Consequently, the lower end portion of the outboard boom 15 moves in a direction away from the base riser 11.

Figure 3:
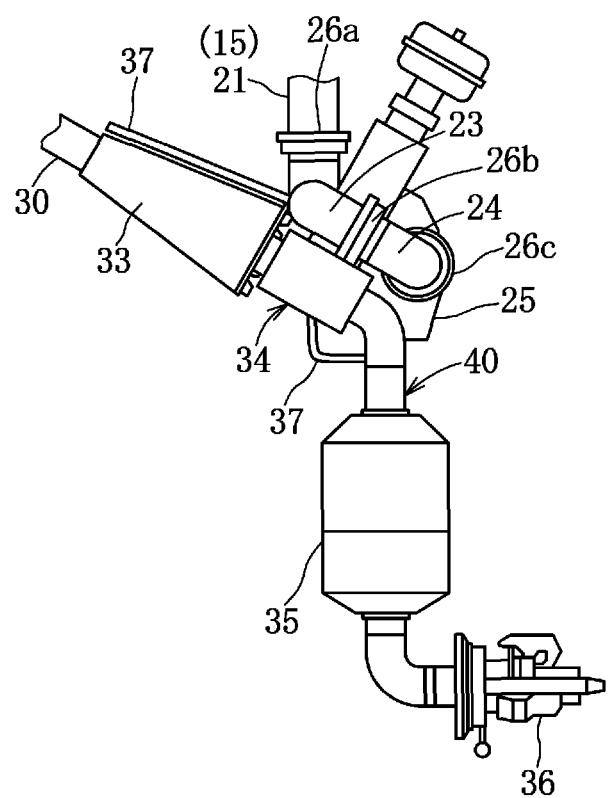
FIG. 3 is a side view of a vacuum insulation double tube and the like connected to the distal end of the vacuum insulation double connecting tube.

As shown in FIG. 3, the outboard boom 15 includes a first bent member 23 provided on the distal end side of the outboard boom 15, a second bent member 24, and a connecting member 25 connected with the distal end portion of the vacuum insulation double tube 30. The upper end portion of the first bent member 23 is connected to the distal end of the main frame 21 of the outboard boom 15 through a first rotating connecting portion 26a that is rotatable around the vertical axis. The upper end portion of the second bent member 24 is connected to the lower end portion of the first bent member 23 through a second rotating connecting portion 26b that is rotatable around the inclined axis. The connecting member 25 is connected to the lower end of the second bent member 24 through a third rotating connection portion 26c that is rotatable around the horizontal axis.

Accordingly, even if the liquefied hydrogen transport ship 2 swings during the transportation of liquefied hydrogen, since displacement and rotation can be absorbed through the first to third rotating connecting portions 26a to 26c, the support frame structure 10 can be prevented from being damaged. Note that the first to third rotating connecting portions 26a to 26c may be formed from rotatory joints.

The outboard boom 15 is provided with an extended member 15a extending downward from its distal end. A mount base 27 is erected on the ground, on which the extended member 15a is mounted when the loading arm 1 is in an inactive state (pause state).

The counterweight 16 is attached to the proximal end connecting member 17. The counterweight 16 applies rotational moment to the support frame structure 10 in the clockwise direction in FIG. 2 to almost balance with counterclockwise rotational moment acting on the support frame structure 10 due to the own weights of a portion, which is located above the midway connecting member 18, of the inboard boom 12 and the own weights of the outboard boom 15. While the support frame structure 10 is in a pause state with the extended member 15a being mounted on the mount base 27, the counterclockwise rotational moment is set to be slightly larger than the clockwise rotational moment.

In this case, as shown in FIG. 2, the support frame structure 10 is provided with a first fluid pressure cylinder 28 (for example, a hydraulic cylinder) capable of making the inboard boom 12 pivot and a second fluid pressure cylinder 29 (for example, a hydraulic cylinder) capable of changing the opening angle A between the inboard boom 12 and the outboard boom 15. FIG. 1 omits the illustration of the first and second fluid pressure cylinders 28 and 29.

The first fluid pressure cylinder 28 is disposed on the rear surface side of the base riser 11 in a posture slightly inclined from the vertical. The proximal end portion of the cylinder body is joined to a lower portion of the base riser 11 with a pin joint portion 28a so as to be pivotable about the horizontal axis. The distal end portion of a piston rod is joined to a lower end side portion of the lower inclined frame 14 of the inboard boom 12 with a pin joint portion 28b so as to be pivotable about the horizontal axis.

When the piston rod of the first fluid pressure cylinder 28 extends, the inboard boom 12 pivots counterclockwise in FIG. 2. When the piston rod retracts, the inboard boom 12 pivots clockwise. The second fluid pressure cylinder 29 is disposed on a lower end side portion of the inboard boom 12 in an inclined posture between the two inclined frames 13 and 14. The proximal end portion of the cylinder body is joined to the lower inclined frame 14 with a pin joint portion 29a so as to be pivotable about the horizontal axis. The distal end portion of the piston rod is jointed to the upper inclined frame 13 with a pin joint portion 29b so as to be pivotable about the horizontal axis.

When the piston rod of the second fluid pressure cylinder 29 extends, the upper inclined frame 13 moves upward relative to the lower inclined frame 14. As a result, the opening angle A between the inboard boom 12 and the outboard boom 15 decreases. When the piston rod retracts, the upper inclined frame 13 moves downward relative to the lower inclined frame 14, and the opening angle A between the inboard boom 12 and the outboard boom 15 increases.

The flexible vacuum insulation double tube 30 includes an inner tube formed from a metal (for example, SUS) flexible tube, an outer tube formed from a metal (for example, SUS) flexible tube fitted on the inner tube, and a vacuum layer between the inner tube and the outer tube. The inner tube has a diameter of, for example, 150 mmφ, and the outer tube has a diameter of, for example, 200 mmφ. A spacer in the form of a coil spring made of a synthetic resin (for example, fluorine resin) is interposed between the inner tube and the outer tube. Note that a super insulation material is wound on the outer circumferential surface of the inner tube.

As shown in FIGS. 1 and 2, the proximal end portion of the vacuum insulation double tube 30 is connected to a liquefied hydrogen tubing 31 connected to a liquefied hydrogen storage low-temperature tank, and a buffer member 32 is fitted on the vacuum insulation double tube 30 at its connecting portion.

As shown in FIGS. 1 and 2, the vacuum insulation double tube 30 is disposed in an upward curved shape (inverted U shape) in a space below the support frame structure 10. The distal end portion of the vacuum insulation double tube 30 is connected to the vacuum insulation double connecting tube 40. The vacuum insulation double connecting tube 40 is connected to the connecting member 25 of the distal end portion of the outboard boom 15. A buffer member 33 is fitted on the vacuum insulation double tube 30 at the connecting portion between the vacuum insulation double tube 30 and the vacuum insulation double connecting tube 40.

As shown in FIG. 3, an arm-side opening/closing valve 34 (to be simply referred to as an "opening/closing valve 34" hereinafter) is interposed in an upper portion of the vacuum insulation double connecting tube 40. An emergency release system 35 (ERS) is interposed in a midway portion of the vacuum insulation double connecting tube 40. A male-side joint 36 of a bayonet joint is connected to the lower end portion of the vacuum insulation double connecting tube 40. With this arrangement, closing the opening/closing valve 34 at the time of activation of the emergency release system 35 (ERS) can reduce the amount of liquefied hydrogen generated on the atmospheric open side of the emergency release system 35 (ERS).

As shown in FIGS. 2 and 3, a small-diameter piggyback line 37 is disposed along the vacuum insulation double tube 30. The piggyback line 37 is a flexible tube made of SUS and having a vacuum insulation double tube structure, for example. The proximal end portion of the piggyback line 37 is configured to be selectively connected to a nitrogen gas supply tubing 45a, a hydrogen gas supply tubing/hydrogen gas recovery tubing 45b, and an atmosphere open tubing 45c on the land through a land-side opening/closing valve (to be described later) and a plurality of switching valves (not shown). The nitrogen gas supply tubing 45a is equivalent to an inactive gas tubing according to the present invention, and the hydrogen gas supply tubing and hydrogen gas recovery tubing 45b are equivalent to a hydrogen gas tubing according to the present invention. The distal end portion of the piggyback line 37 is connected to a portion, which is located between the opening/closing valve 34 and the emergency release system 35, of the vacuum insulation double connecting tube 40.

The midway portion support mechanism 50 supports the lengthwise midway portion of the vacuum insulation double tube 30 on the support frame structure 10 through a hard curved member 51 curved upward in a convex shape, and includes the curved member 51 made of a steel plate and curved in an arc shape, a tensile rope 52 connected to the curved member 51, a plurality of idling guide rings 53a and 53b that support the tensile rope 52 on the support frame structure 10, and a weight body 54 for weight balancing which is connected to the proximal end portion of the tensile rope 52.

As shown in FIG. 2, the support frame structure 10 is provided with a first guide member 55, a second guide member 56, and a fluid pressure cylinder 57, which guide the vacuum insulation double tube 30 so as to prevent it from pivoting outward from a vertical plane including the support frame structure 10.

A liquefied hydrogen transport method of transporting liquefied hydrogen between a low-temperature tank on the land and a low-temperature tank on a liquefied hydrogen transport ship via first and second loading arms 1A and 1B will be described with reference to FIGS. 4 to 12. The first loading arm 1A is mainly used to transport liquefied hydrogen. The second loading arm 1B is used to transport hydrogen gas between the low-temperature tank in the liquefied hydrogen transport ship and the low-temperature tank on the land in a direction opposite to the transport direction of the liquefied hydrogen while the liquefied hydrogen is transported. The first and second loading arms 1A and 1B are arranged side by side in advance.

The first and second loading arms 1A and 1B, of the three loading arms shown in FIG. 1, and the tubings and valves (plumbing) of a manifold 3 of the liquefied hydrogen transport ship 2 will be described first with reference to FIG. 4.

Reference numerals denoting tubings and the like of the first and second loading arms 1A and 1B, which have been described with reference to FIGS. 2 and 3, are attached with suffixes "A" and "B".

The first loading arm 1A includes a vacuum insulation double tube 30A, a piggyback line 37A, a bayonet joint 30Aa attached to the vacuum insulation double tube 30A, a bayonet joint 37Aa attached to the piggyback line 37A, an opening/closing valve 34A, an emergency release system 35A, and a male-side joint 36A which are attached to a vacuum insulation double connecting tube 40A connected to the vacuum insulation double tube 30A, a land-side liquefied hydrogen tubing 31A connected to the vacuum insulation double tube 30A, an opening/closing valve 31Aa attached to the liquefied hydrogen tubing 31A, a gas tubing 38A connected to the piggyback line 37A, a land-side opening/closing valve 37Ab (to be simply referred to as the "opening/closing valve 37Ab" hereinafter) attached to the gas tubing 38A, and the like.

The second loading arm 1B includes a vacuum insulation double tube 30B, a piggyback line 37B, a bayonet joint 30Ba attached to the vacuum insulation double tube 30B, a bayonet joint 37Ba attached to the piggyback line 37B, an opening/closing valve 34B, an emergency release system 35B, and a male-side joint 36B of the bayonet joint, which are attached to a vacuum insulation double connecting tube 40B connected to the vacuum insulation double tube 30B, a land-side hydrogen gas tubing 31B connected to the vacuum insulation double tube 30B, an opening/closing valve 31Ba attached to the hydrogen gas tubing 31B, a gas tubing 38B connected to the piggyback line 37B, a land-side opening/closing valve 37Bb (to be referred to as the "opening/closing valve 37Bb" hereinafter) attached to the gas tubing 38B, and the like.

The manifold 3 of the liquefied hydrogen transport ship 2 includes a liquefied hydrogen tubing 41A connected to a liquid phase portion of a low-temperature tank in the transport ship 2, a female-side joint 4A of a bayonet joint on the distal end of the liquefied hydrogen tubing 41A, an opening/closing valve 41Aa attached to the liquefied hydrogen tubing 41A, a hydrogen gas tubing 41B connected to a gas phase of the low-temperature tank in the transport ship 2, a female-side joint 4B of a bayonet joint on the distal and of the hydrogen gas tubing 41B, an opening/closing valve 41Ba attached to the hydrogen gas tubing 41B, a connecting tubing 42 connecting the liquefied hydrogen tubing 41A to the hydrogen gas tubing 41B, an opening/closing valve 42a attached to the connecting tubing 42, and the like.

The first and second loading arms 1A and 1B are connected/disconnected to/from the manifold 3 on the transport ship 2. Setting the bayonet joint (the male-side joint 36A and the female-side joint 4A) in the connected state will connect the first loading arm 1A to the manifold 3. Setting the bayonet joint in the disconnected state will disconnect the first loading arm 1A from the manifold 3. This relationship is the same as that between the second loading arm 1B, the manifold 3, and the bayonet joint (the male-side joint 36B and the female-side joint 4B). The first and second loading arms 1A and 1B are configured to be connected/cut off to/from each other through the manifold 3 while both the first loading arm 1A and the second loading arm 1B are connected to the manifold 3. More specifically, the distal end portion of the vacuum insulation double connecting tube 40A of the first loading arm 1A is connected to the vacuum insulation double connecting tube 40B of the second loading arm 1B through the liquefied hydrogen tubing 41A, the connecting tubing 42, and the hydrogen gas tubing 41B. When the opening/closing valve 42a on the connecting tubing 42 is open, the vacuum insulation double connecting tubings 40A and 40B are connected to each other. When the opening/closing valve 42a is closed, the vacuum insulation double connecting tube 40A is cut off from the vacuum insulation double connecting tube 40B. Note that the distal end portion of the vacuum insulation double connecting tube 40A communicates with the vacuum insulation double tube 30A and the piggyback line 37A, and the distal end portion of the vacuum insulation double connecting tube 40B communicates with the vacuum insulation double tube 30B and the piggyback line 37B. These four tubings are configured to communicate with each other.

A liquefied hydrogen transport method will be described in detail next.

Figure 4:
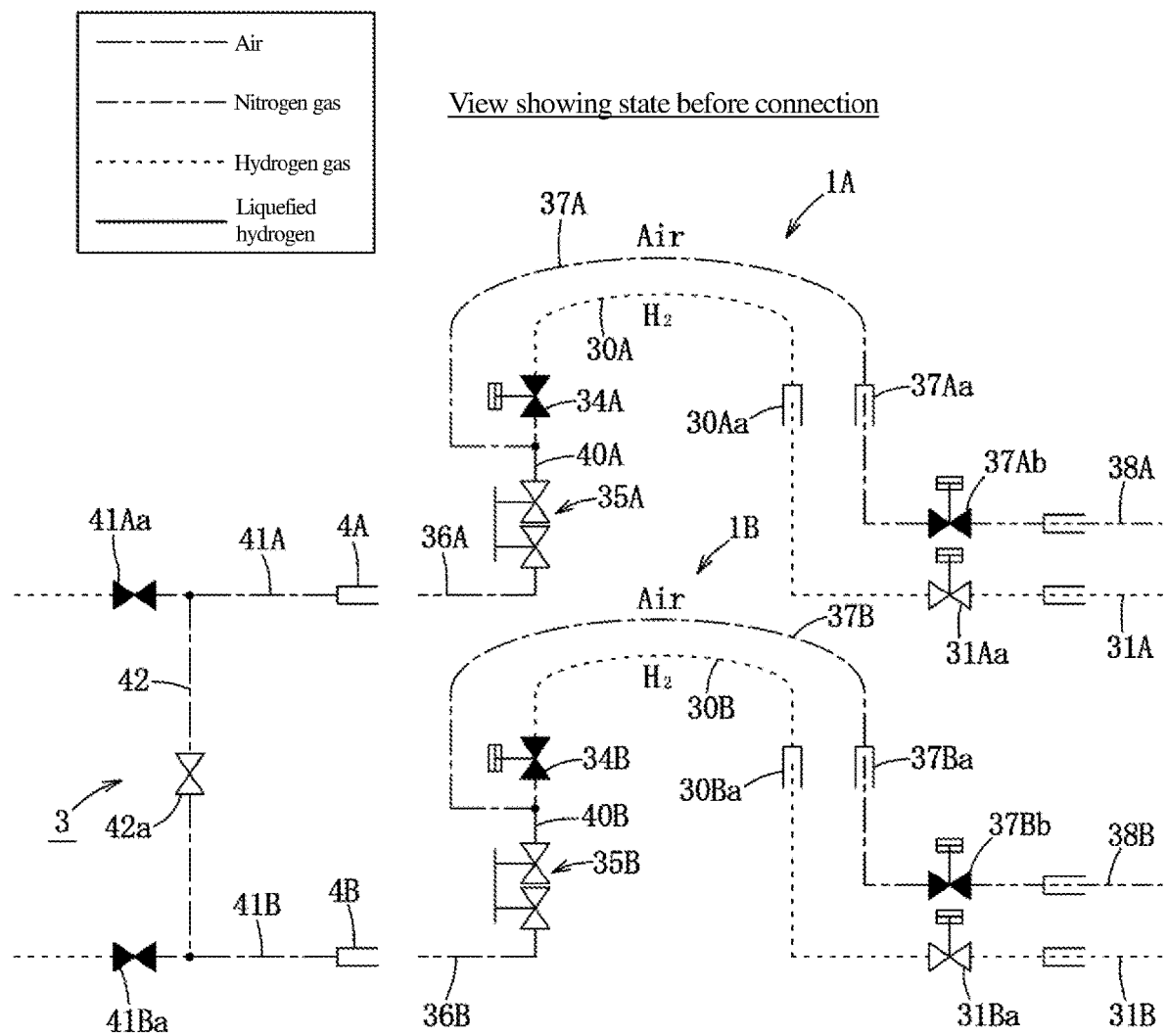
FIG. 4 is a view showing a state of the plumbing of first and second loading arms before connection.

FIG. 4 shows a state before the first and second loading arms 1A and 1B are connected to the manifold 3. In this state, the vacuum insulation double tubes 30A and 30B, the liquefied hydrogen tubing 31A, and the hydrogen gas tubing 31B are filled with hydrogen gas, and the opening/closing valves 34A and 34B are closed.

Since the opening/closing valves 37Ab and 37Bb are closed and the male-side joints 36A and 36B are open to the atmosphere, the piggyback lines 37A and 37B contain air. Since the female-side joints 4A and 4B are open to the atmosphere, the liquefied hydrogen tubing 41A, the hydrogen gas tubing 41B, and the connecting tubing 42 of the manifold 3 contain air. Note, however, that the opening/closing valves 41Aa and 41Ba are closed.

Figure 5:
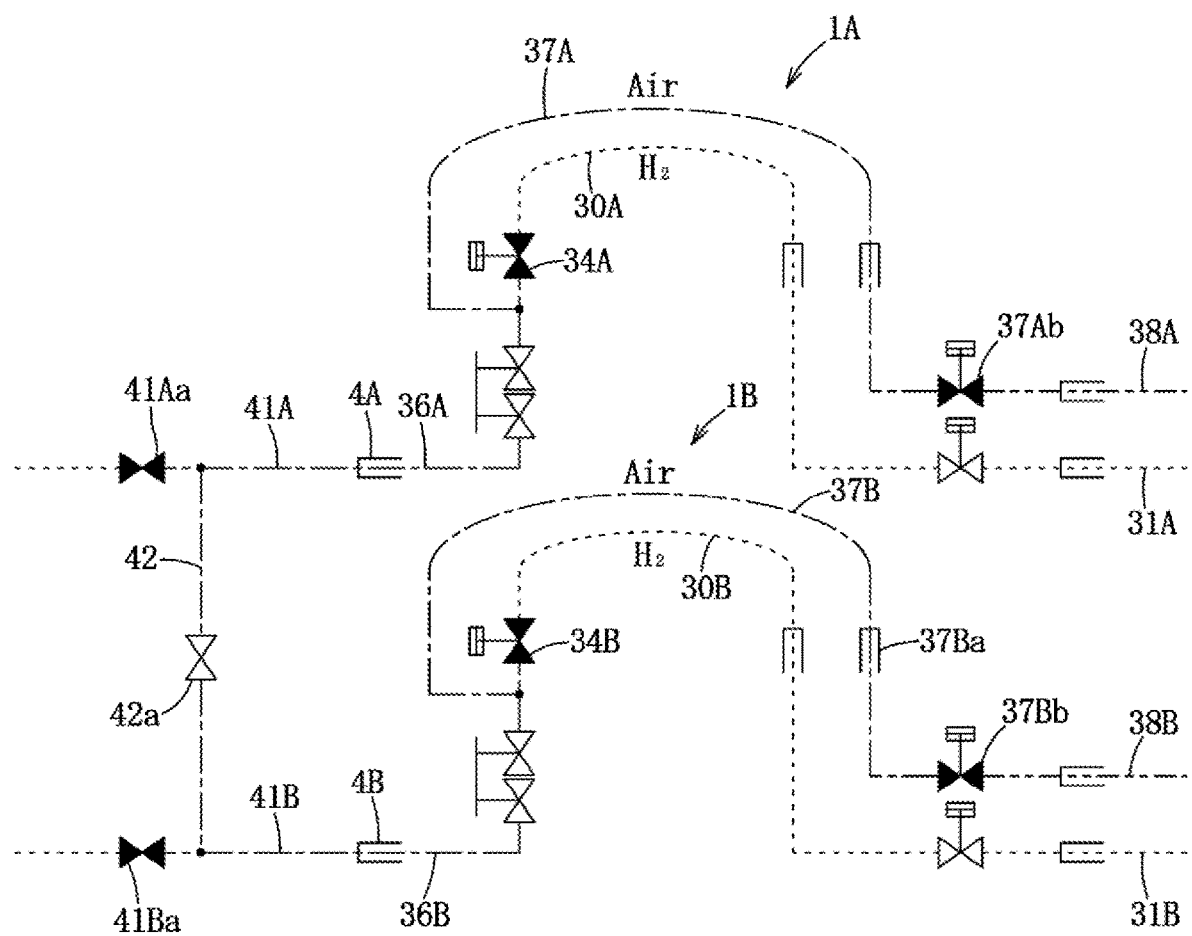
FIG. 5 is a view showing a state of the plumbing of the first and second loading arms after connection.

In the first step, as shown in FIG. 5, while the vacuum insulation double tubes 30A and 30B of the first and second loading arms 1A and 1B are filled with hydrogen gas and air is mixed in the piggyback lines 37A and 37B, the male-side joints 36A and 36B of the first and second loading arms 1A and 1B are connected to the female-side joints 4A and 4B of the manifold 3. Note that the opening/closing valves 34A and 34B, the opening/closing valves 41Aa and 41Ba, and the opening/closing valves 37Ab and 37Bb are kept closed.

Figure 6:
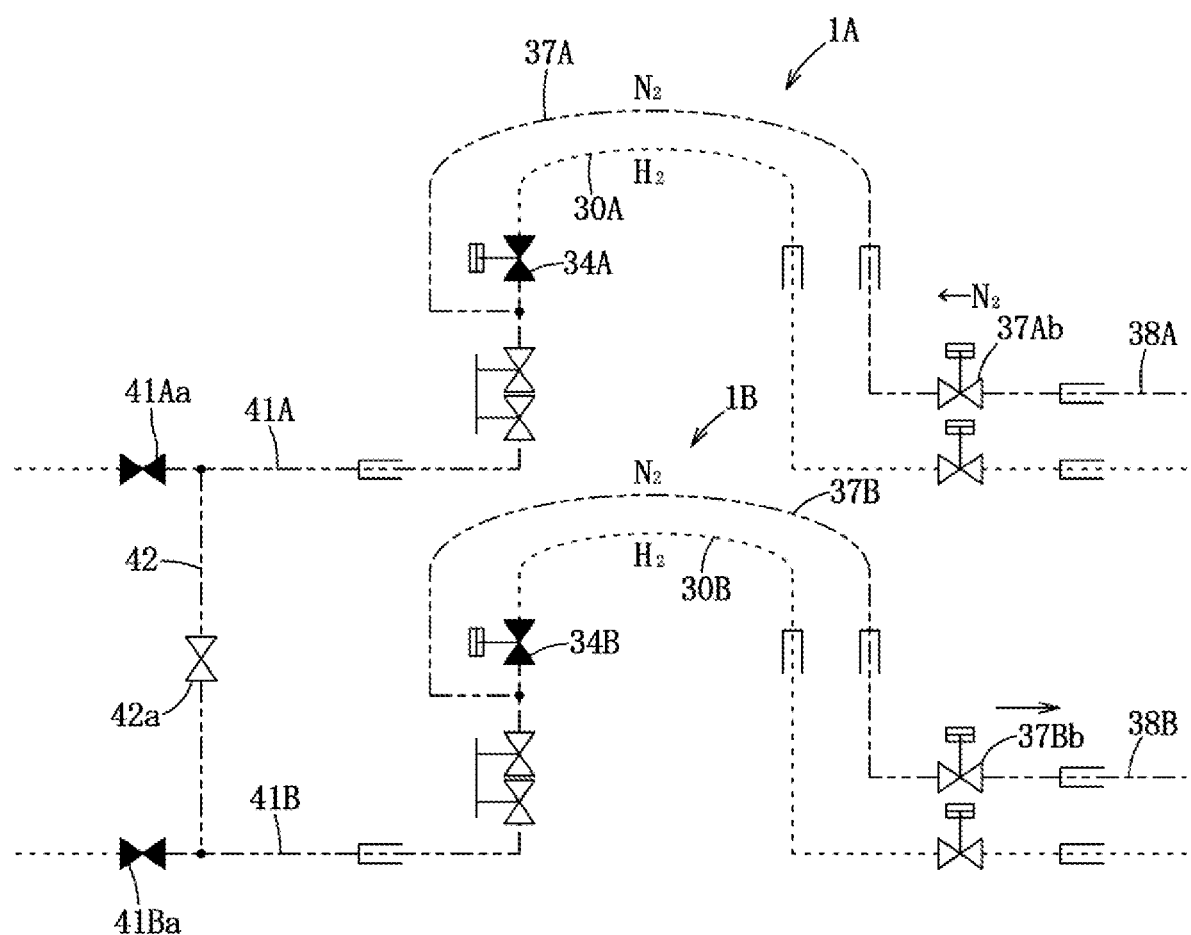
FIG. 6 is a view showing a state of the plumbing of the first and second loading arms after air purging by nitrogen gas.

As shown in FIG. 6, the second step includes opening the opening/closing valves 37Ab and 37Bb, connecting the gas tubing 38A to a nitrogen gas supply tubing 45Aa (see FIG. 4), supplying nitrogen gas (corresponding to an inactive gas) to the piggyback line 37A of the first loading arm 1A, taking in a gas mixture of nitrogen gas and air from the piggyback line 37B of the second loading arm 1B connected the first loading arm 1A to the land through the liquefied hydrogen tubing 41A, the connecting tubing 42, and the hydrogen gas tubing 41B, and discharging the gas mixture to the atmosphere through the gas tubing 38B and the atmosphere open tubing connected thereto. Note that the vacuum insulation double tubes 30A and 30B contain hydrogen gas. Nitrogen gas may be supplied through the second loading arm 1B, and a gas mixture of nitrogen gas and air may be taken in to the land through the first loading arm 1A.

Figure 7:
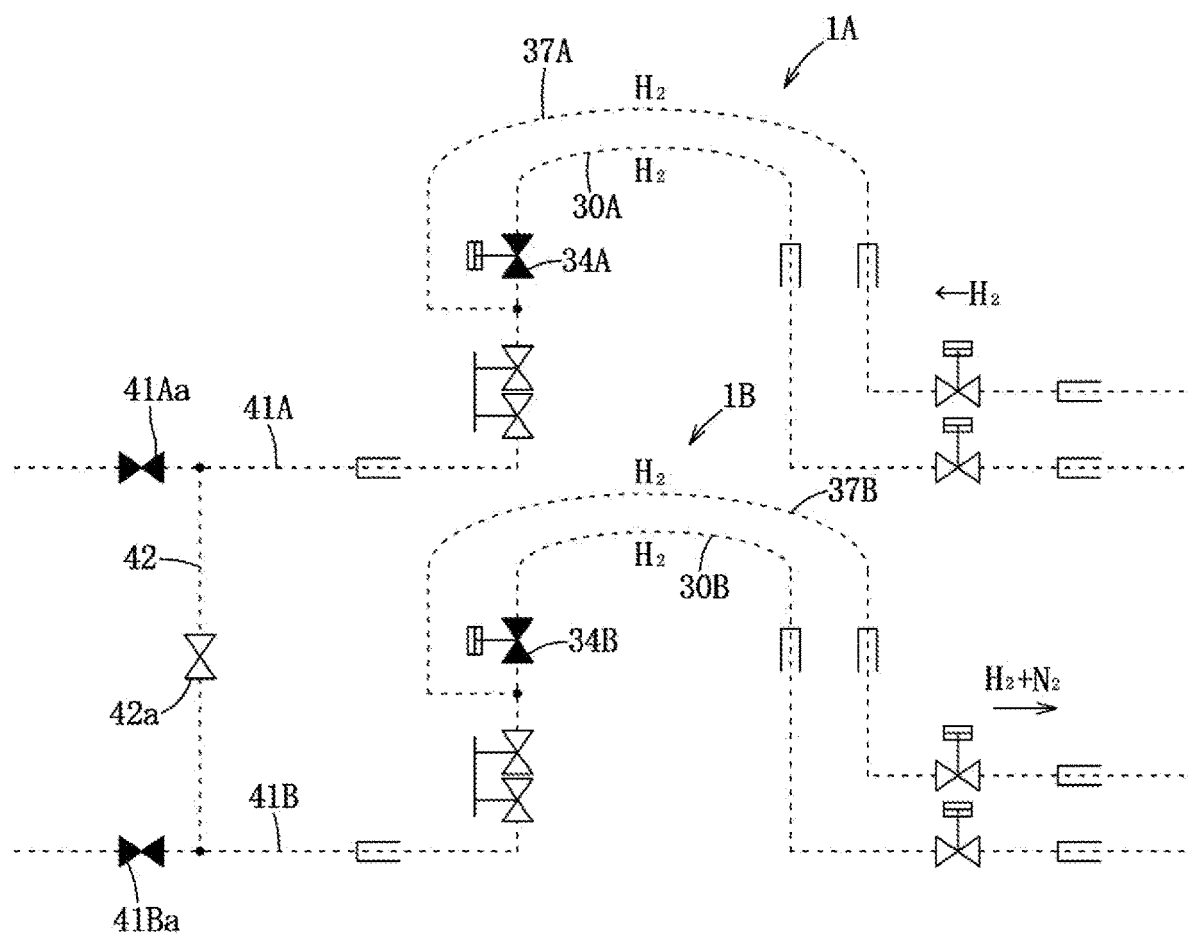
FIG. 7 is a view showing a state of the plumbing of the first and second loading arms after nitrogen gas purging by hydrogen gas.

As shown in FIG. 7, the third step includes connecting the gas tubing 38A to the hydrogen gas supply tubing 45b (see FIG. 2), supplying hydrogen gas to the piggyback line 37A of the first loading arm 1A, taking in a gas mixture of hydrogen gas and nitrogen gas from the piggyback line 37B of the second loading arm 1B connected to the first loading arm 1A through the liquefied hydrogen tubing 41A, the connecting tubing 42, and the hydrogen gas tubing 41B, and supplying the gas mixture to a hydrogen gas recovery device through the gas tubing 38B and the hydrogen gas recovery tubing 45b (see FIG. 2) connected thereto. Hydrogen gas may be supplied through the second loading arm 1B, and a gas mixture of hydrogen gas and nitrogen gas may be taken in through the first loading arm 1A.

Figure 8:
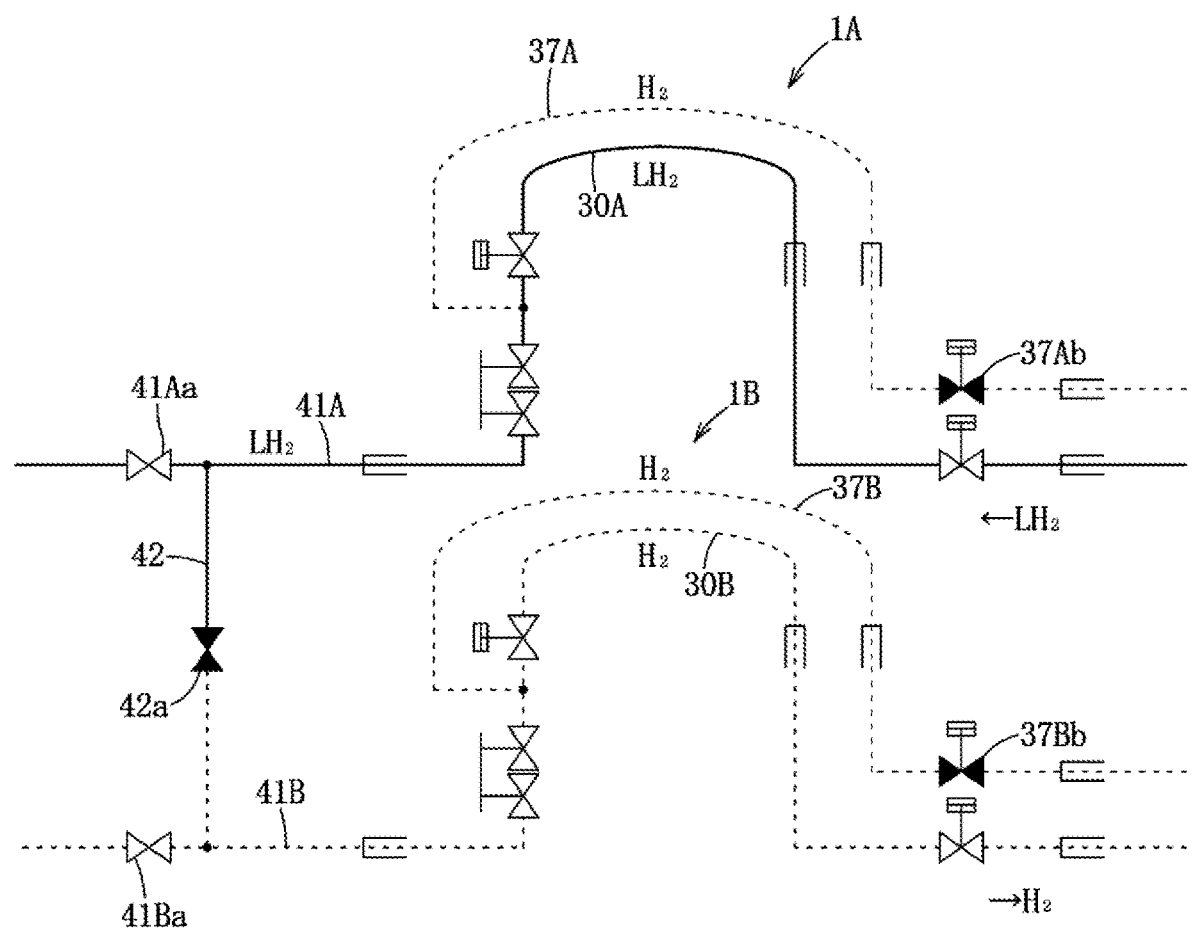
FIG. 8 is a view showing a state of the plumbing, which shows a state of pre-cooling and cargo handling (liquefied hydrogen transportation).

Subsequently, while the vacuum insulation double tube 30A of the first loading arm 1A is pre-cooled by hydrogen gas, as shown in FIG. 8, the fourth step includes opening the opening/closing valves 41Aa and 41Ba, closing the opening/closing valve 42a, transporting liquefied hydrogen (LH$_2$) from the low-temperature tank on the land to the low-temperature tank in the liquefied hydrogen transport ship 2 through the vacuum insulation double tube 30A of the first loading arm 1A, and transporting hydrogen gas from the low-temperature tank in the transport ship 2 to the low-temperature tank on the land through the vacuum insulation double tube 30B of the second loading arm 1B.

Figure 9:
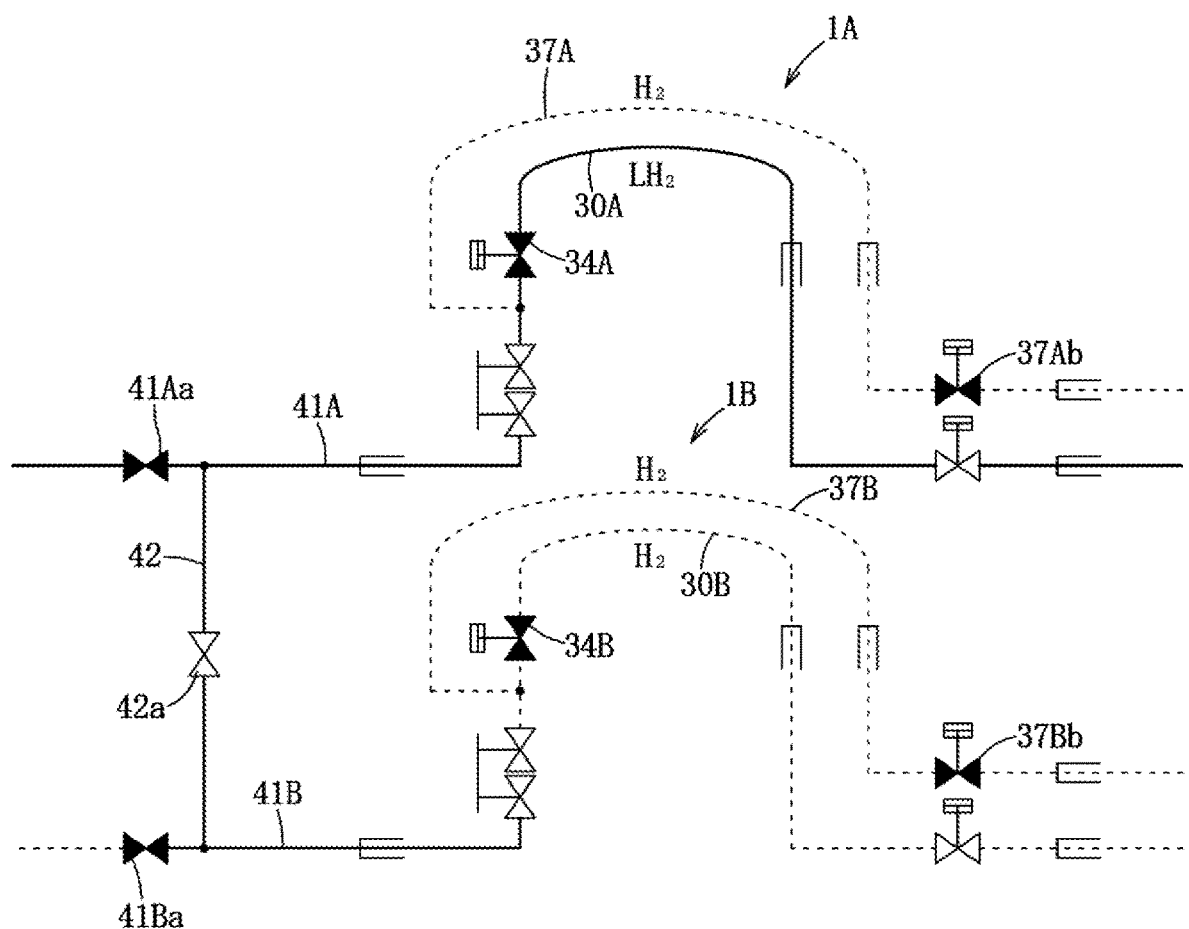
FIG. 9 is a view showing a state of the plumbing, which shows a cargo handing end state.

FIG. 9 shows a cargo handling end state. Since the opening/closing valves 41Aa and 41Ba are closed after cargo handling and the opening/closing valve 42a is open, the liquefied hydrogen tubing 41A, the connecting tubing 42, and the hydrogen gas tubing 41B are filled with liquefied hydrogen. In the liquefied hydrogen tubing 41A, the connecting tubing 42, and the hydrogen gas tubing 41B, vaporization of liquefied hydrogen proceeds. Note that the opening/closing valves 37Ab and 37Bb are kept closed.

Figure 10:
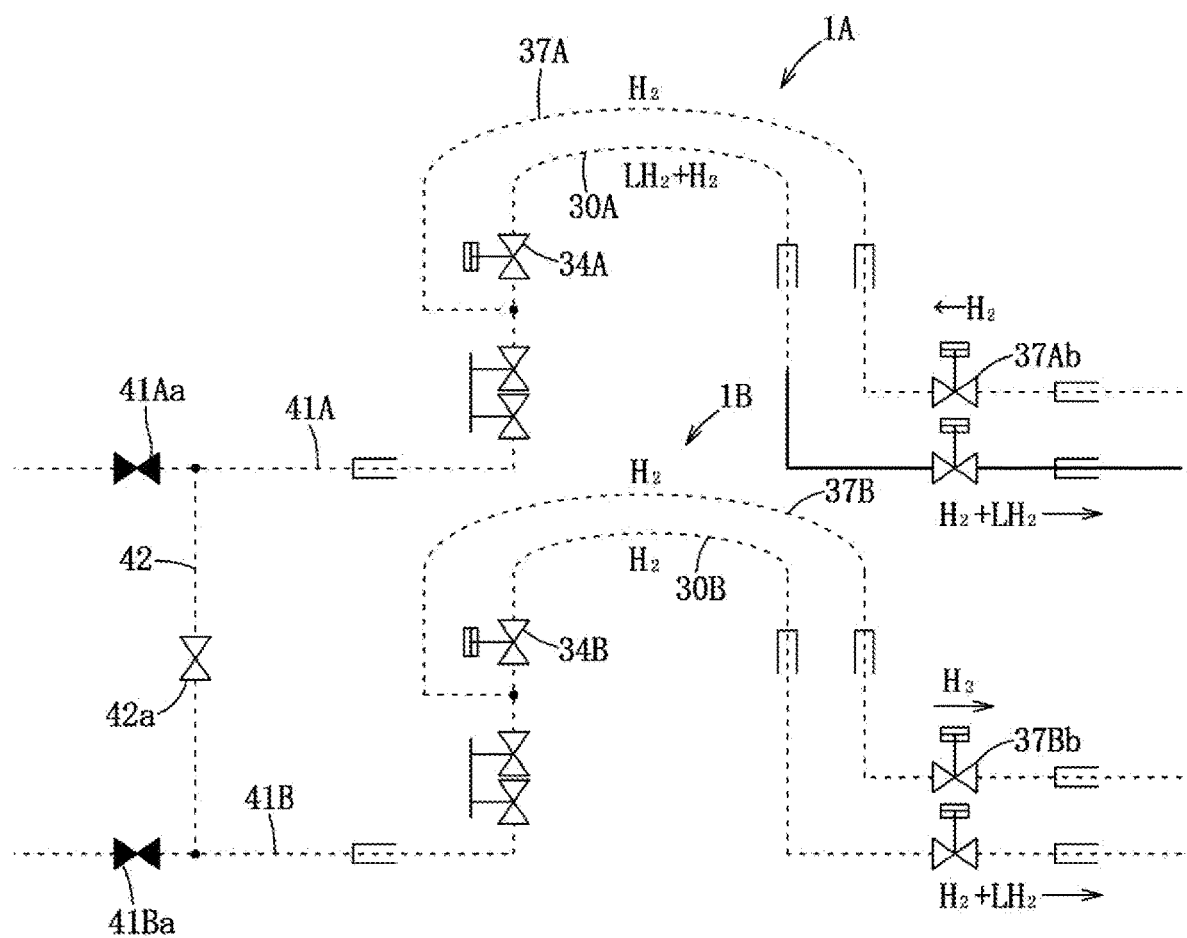
FIG. 10 is a view showing a state of the plumbing at the time of liquid pushing.

As shown in FIG. 10, the fifth step following the fourth step includes maintaining the first and second loading arms 1A and 1B in the connected state through the manifold 3, opening the opening/closing valves 34A and 34B, opening the opening/closing valves 37Ab and 37Bb, supplying hydrogen gas from the hydrogen gas supply tubing 45b (see FIG. 2) to the piggyback line 37A of the first loading arm 1A, and taking in liquefied hydrogen and hydrogen gas through the vacuum insulation double tubes 30A and 30B of the first and second loading arms 1A and 1B. At this time, the hydrogen gas evaporated from the liquefied hydrogen at the manifold 3 of the transport ship 2 is taken in through the vacuum insulation double tube 30B.

Figure 11:
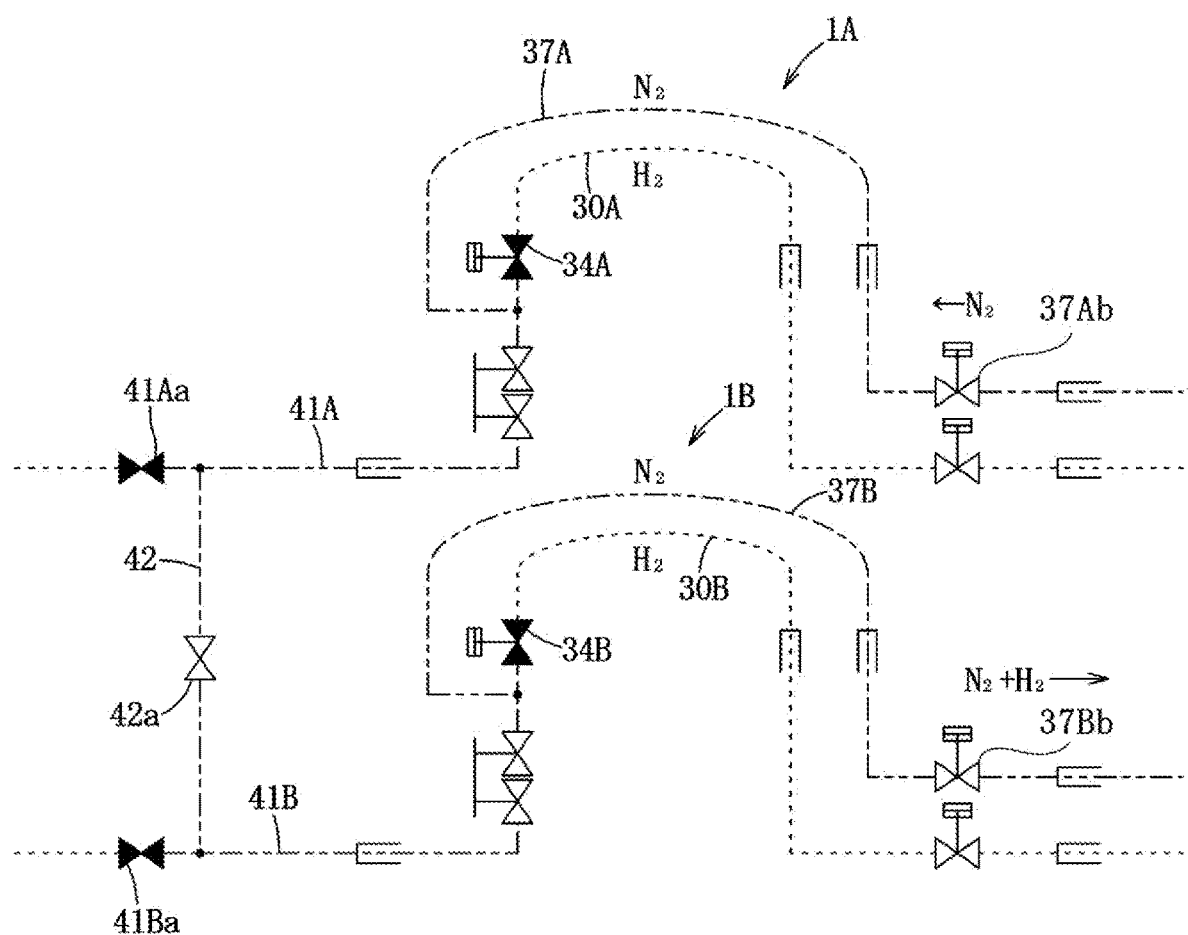
FIG. 11 is a view showing a state of the plumbing after hydrogen gas purging by $N_2$ gas.

As shown in FIG. 11, the sixth step following the fifth step includes opening the opening/closing valves 34A and 34B, keeping the opening/closing valves 37Ab and 37Bb open, supplying nitrogen gas from the hydrogen gas supply tubing 45b (see FIG. 2) to the piggyback line 37A of the first loading arm 1A, taking in hydrogen gas and nitrogen gas from the piggyback line 37B of the second loading arm 1B connected to the first loading arm 1A to the land through the liquefied hydrogen tubing 41A, the connecting tubing 42, and the hydrogen gas tubing 41B, and replacing gas in piggyback lines 37A and 37B of the first and second loading arms 1A and 1B with nitrogen gas. Note, however, that nitrogen gas may be supplied through the second loading arm 1B, and hydrogen gas and nitrogen gas may be taken in to the land through the first loading arm 1A.

Figure 12:
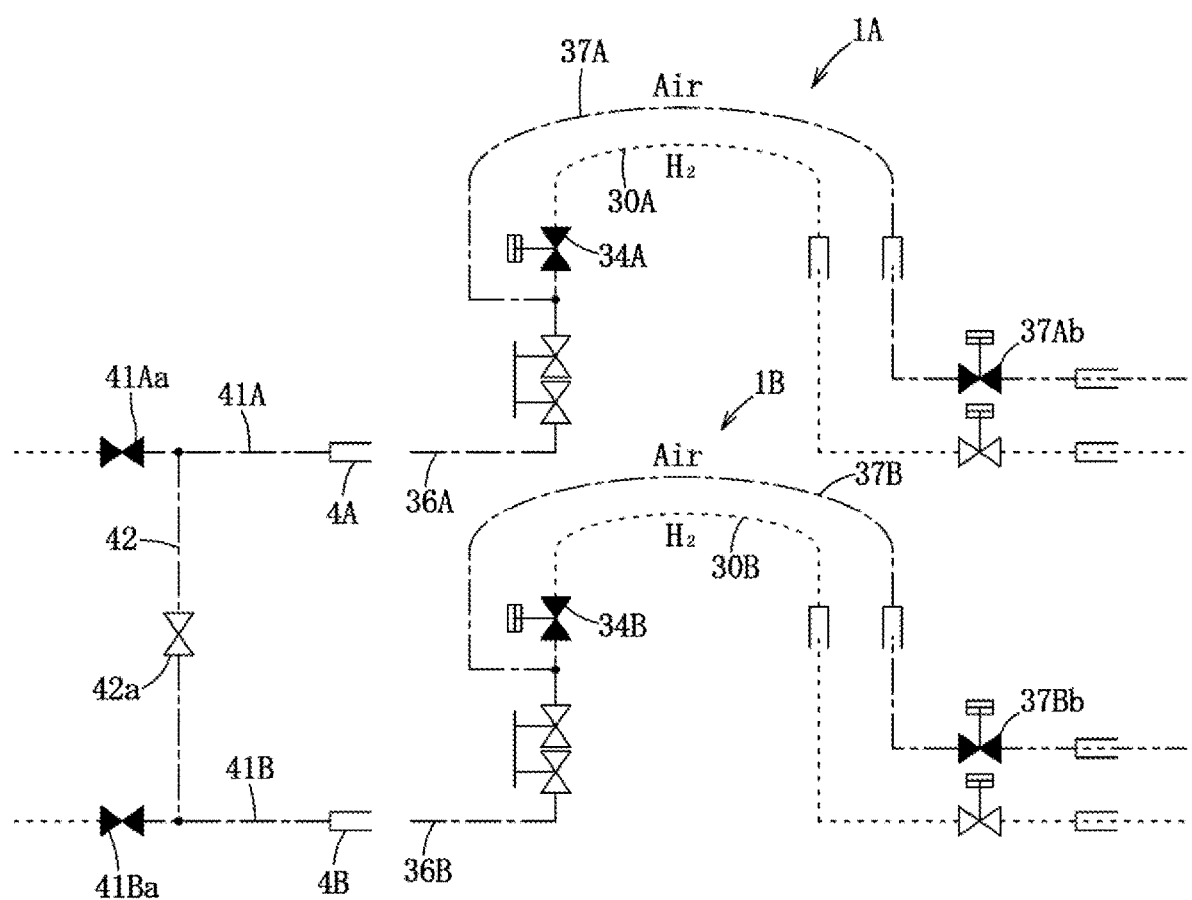
FIG. 12 is a view showing a state of the plumbing after disconnection between the first and second loading arms.

As shown in FIG. 12, the seventh step following the sixth step includes closing the opening/closing valves 37Ab and 37Bb, separating the male-side joints 36A and 36B of the first and second loading arms 1A and 1B from the female-side joints 4A and 4B on the manifold 3, and filling the vacuum insulation double tubes 30A and 30B of the first and second loading arms 1A and 1B with hydrogen gas. The piggyback lines 37A and 37B of the first and second loading arms 1A and 1B are filled with air. Note that the state shown in FIG. 12 is the same as that shown in FIG. 4.

The function and effect of the above loading arm 1 will be described below.

When the loading arm 1 is in the inactive state (pause state), the extended member 15a can be mounted on the mount base 27 and kept in the still state, as shown in FIG. 2.

The inboard boom 12 can be driven to pivot by the first fluid pressure cylinder 28, and the opening angle A between the inboard boom 12 and the outboard boom 15 can be changed by the second fluid pressure cylinder 29. This makes it possible to move the distal end portion of the outboard boom 15 to a desired position through the first and second fluid pressure cylinders 28 and 29.

When the liquefied hydrogen transport ship 2 is docked at the quay to unload liquefied hydrogen, the first and second fluid pressure cylinders 28 and 29 are operated to bring the distal end portion of the outboard boom 15 of the loading arm 1 close to the manifold 3 of the plumbing of the liquefied hydrogen transport ship 2, the male-side joint 36 of the bayonet joint of the distal end of the vacuum insulation double connecting tube 40 is connected to the female-side joint of the bayonet joint of the manifold 3, and liquefied hydrogen is unloaded to the liquefied hydrogen storage tank on the land.

Since the flexible vacuum insulation double tube 30 for transporting liquefied hydrogen is used and supported by the support frame structure 10, tubings for transporting liquefied hydrogen can be omitted. This makes it unnecessary to provide any swivel joint. Since the vacuum insulation double tube 30 is disposed in an upward curved shape in a space below the support frame structure 10, it is possible to achieve a reduction in facility cost by minimizing the length of the vacuum insulation double tube 30.

Since the vacuum insulation double connecting tube 40 connected to the distal end portion of the vacuum insulation double tube 30 is connected to the connecting member 25 at the distal end portion of the outboard boom 15, it is possible to cause the support frame structure 10 to support the distal end side portion of the vacuum insulation double tube 30 and move the vacuum insulation double connecting tube 40.

The midway portion support mechanism 50 is provided to support the lengthwise midway portion of the vacuum insulation double tube 30 on the support frame structure 10 through the curved member 51 curved upward. This allows the vacuum insulation double tube 30 to be curved in a shape conforming to the curved member 51 without bending a midway portion of the vacuum insulation double tube 30 and damage to the vacuum insulation double tube 30 can be prevented.

The function and effect of the above liquefied hydrogen transport method will be described next.

When liquefied hydrogen is to be transported by effectively using the piggyback lines 37A and 37B of the first and second loading arms 1A and 1B, air in the piggyback lines 37A and 37B and air in the tubings of the manifold 3 are replaced with nitrogen gas, and liquefied hydrogen is transported after the nitrogen gas is replaced with hydrogen gas. In addition, liquid pushing of pushing back liquefied hydrogen with hydrogen gas supplied to the piggyback line 37A can be performed. This eliminates the need to replace gas in the vacuum insulation double tubes 30A and 30B with an inactive gas, and hence makes it possible to stand by until the next cargo handing while the vacuum insulation double tubes 30A and 30B contain hydrogen gas.

In particular, since the vacuum insulation double tubes 30A and 30B are formed from flexible tubes and have many corrugations on the inner surfaces of the inner tubes, it takes much time to perform gas replacement. However, as described above, there is no need to perform gas replacement with respect to the vacuum insulation double tubes 30A and 30B, and hence it is possible to shorten the operation time, thus providing a great advantage.

Before transportation (cargo handling) of liquefied hydrogen, gas in the piggyback lines 37A and 37B and the tubings of the manifold 3 are replaced with hydrogen gas. This eliminates the possibility of causing nitrogen gas to come into contact with liquefied hydrogen, and hence prevents solid nitrogen from mixing in liquefied hydrogen.

A liquefied hydrogen transport method according to the second embodiment will be described.

First and second loading arms 51A and 51B used in this liquefied hydrogen transport method and plumbing and the like around them will be described first with reference to FIG. 13.

The first loading arm 51A is mainly used to transport liquefied hydrogen. The second loading arm 51B is used to transport hydrogen gas between a low-temperature tank in a liquefied hydrogen transport ship and a low-temperature tank on the land in a direction opposite to the transportation direction of liquefied hydrogen during the transportation of liquefied hydrogen described above. The tubings and valves (plumbing) of a manifold 3A of a liquefied hydrogen transport ship 2 are the same as those in the first embodiment. Note, however, that the connecting tubing 42 and the opening/closing valve 42a are omitted from the manifold 3 of the liquefied hydrogen transport ship, whereas the facilities on the land are provided with a connecting tubing 95 for connecting gas tubings 88A and 88B and an opening/closing valve 95a interposed in the connecting tubing 95.

The facilities at the first loading arm 51A are provided with a vacuum insulation double tube 80A, a piggyback line 87A, an arm-side opening/closing valve 84A (to be simply referred to as the "opening/closing valve 84A" hereinafter), an emergency release system 85A, and a male-side joint 86A, which are attached to a vacuum insulation double connecting tube 90A connected to the vacuum insulation double tube 80A, land-side liquefied hydrogen tubing 81A connected to the vacuum insulation double tube 80A, an opening/closing valve 81Aa attached to the liquefied hydrogen tubing 81A, a gas tubing 88A connected to the piggyback line 87A, an opening/closing valve 87Ab attached to the gas tubing 88A, and the like.

The facilities at the second loading arm 51B are provided with a vacuum insulation double tube 80B, a piggyback line 87B, an arm-side opening/closing valve 84B (to be simply referred to as the "opening/closing valve 84B" hereinafter), an emergency release system 85B, and a male-side joint 86B of a bayonet joint, which are attached to a vacuum insulation double connecting tube 90B connected to the vacuum insulation double tube 80B, a land-side hydrogen tubing 81B connected to the vacuum insulation double tube 80B, an opening/closing valve 81Ba attached to the liquefied hydrogen tubing 81B, a gas tubing 88B connected to the piggyback line 87B, an opening/closing valve 87Bb attached to the gas tubing 88B, and the like.

The two piggyback lines 87A and 87B are configured to be connected/cut off to/from each other through the connecting tubing 95 and the opening/closing valve 95a interposed therein. When the opening/closing valve 95a is open, the piggyback lines 87A and 87B are connected to each other through the connecting tubing 95. When the opening/closing valve 95a is closed, the piggyback line 87A is cut off from the piggyback line 87B.

The manifold 3A of the liquefied hydrogen transport ship 2 is provided with a liquefied hydrogen tubing 91A connected to the a liquid phase portion of a low-temperature tank in the transport ship 2, a female-side joint 54A of a bayonet joint at the distal end of the liquefied hydrogen tubing 91A, an opening/closing valve 91Aa attached to the liquefied hydrogen tubing 91A, a hydrogen gas tubing 91B connected to a gas phase portion of the low-temperature tank in the transport ship 2, a female-side joint 54B of a bayonet joint at the distal end of the hydrogen gas tubing 91B, an opening/closing valve 91Ba attached to the hydrogen gas tubing 91B, and the like.

A liquefied hydrogen transport method will be described next with reference to FIGS. 13 to 22.

Figure 13:
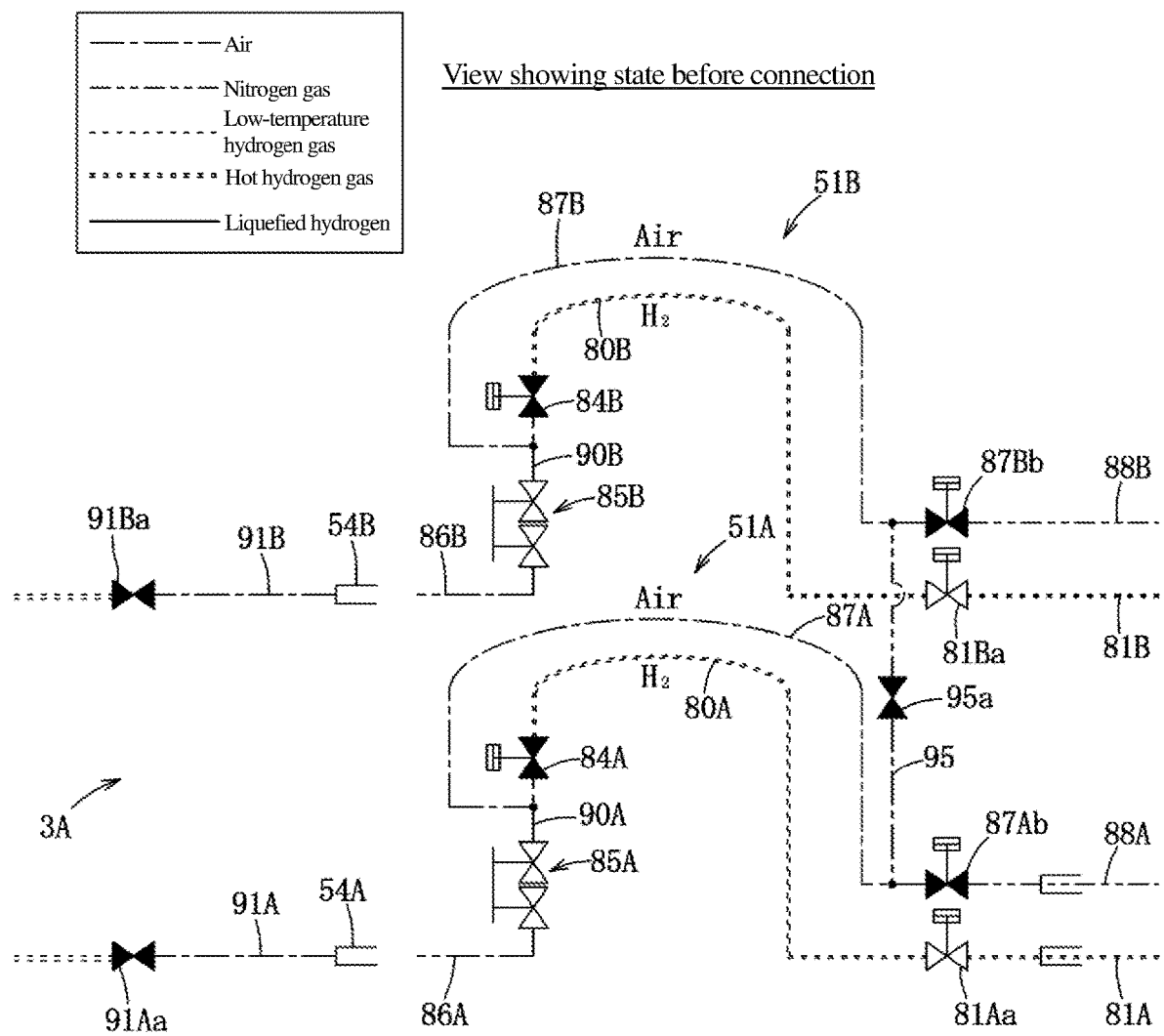
FIGS. 13 to 22 are views according to a second embodiment, with FIG. 13 showing a state of the plumbing of first and second loading arms before connection.
Figure 14:
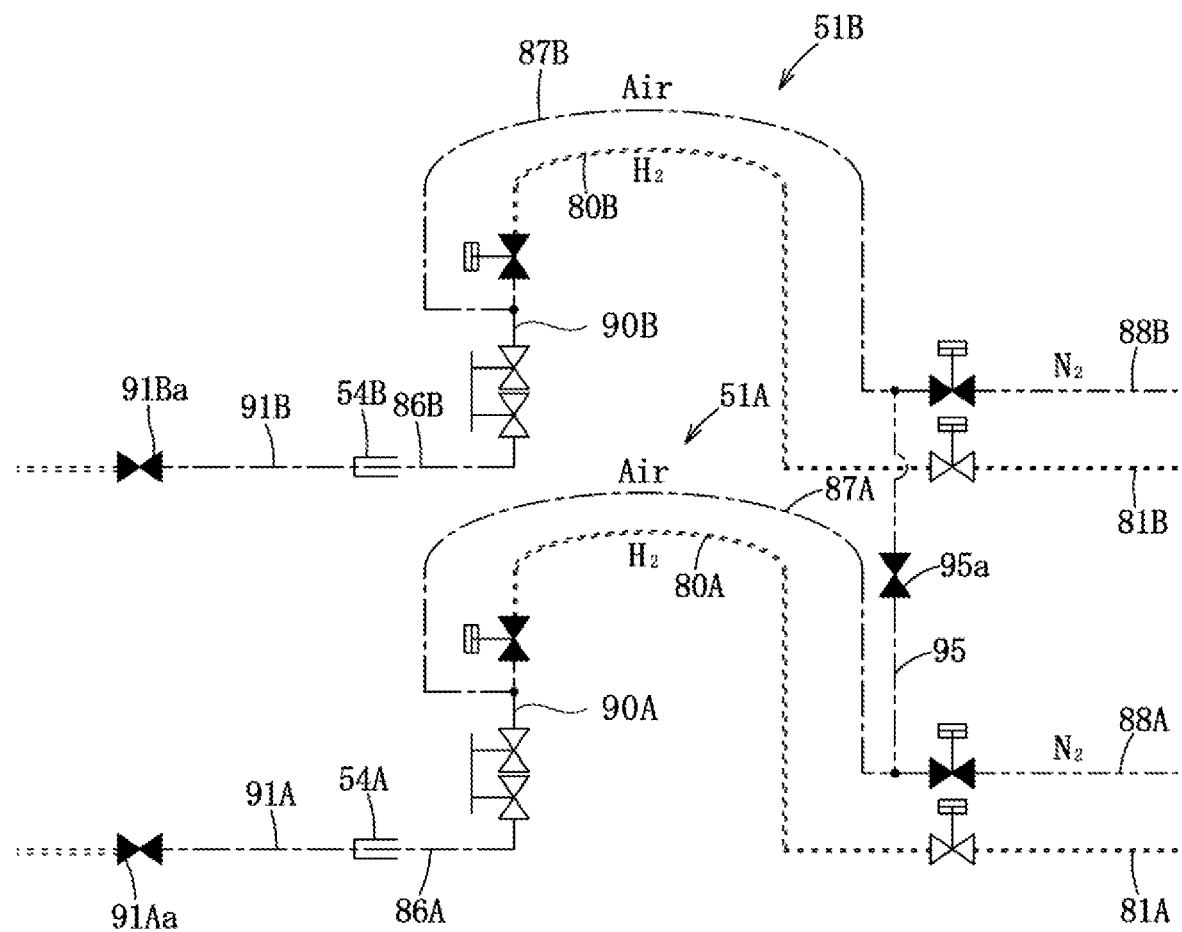

First of all, in the first step, as shown in FIGS. 13 and 14, the male-side joints 86A and 86B of the bayonet joints of the first and second loading arms 51A and 51B are respectively connected to the female-side joints 54A and 54B of the bayonet joints of the manifold 3A. The opening/closing valves 91Aa, 91Ba, 84A, 84B, 87Ab, and 87Bb are closed before (FIG. 13) and immediately after (FIG. 14) the bayonet joints are connected. The piggyback lines 87A and 87B, the vacuum insulation double connecting tubes 90A and 90B, the liquefied hydrogen tubing 91A, and the hydrogen gas tubing 91B contain air, and the vacuum insulation double tubes 80A and 80B contain hot hydrogen gas with a slightly high temperature.

Figure 15:
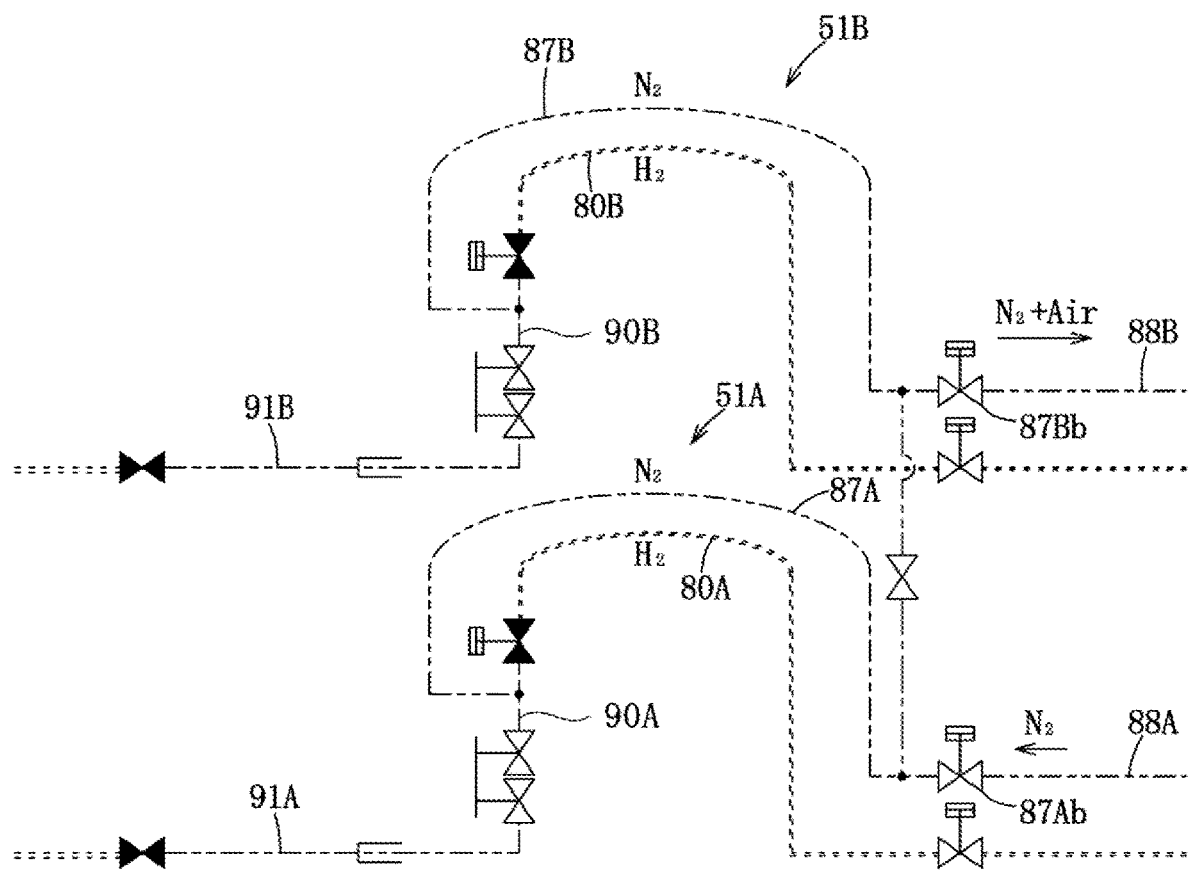

In the second step, as shown in FIG. 15, air in the piggyback lines 87A and 87B, the vacuum insulation double connecting tubes 90A and 90B, the liquefied hydrogen tubing 91A, and the hydrogen gas tubing 91B is replaced with nitrogen gas. When this air/nitrogen gas replacement is to be performed, while the opening/closing valve 87Ab is open and the opening/closing valve 87Bb is closed, nitrogen gas is supplied from the gas tubing 88A to set a pressurized state. The opening/closing valve 87Ab is then closed, and the opening/closing valve 87Bb is open to set a depressurized (reduced pressure) state. The above air/nitrogen gas replacement is thus performed based on a pressure swing scheme of repeating the above operation a plurality of number of times.

Note, however, that nitrogen gas may be supplied through the second loading arm 51B, and nitrogen gas and air may be taken in to the land through the first loading arm 51A.

Figure 16:
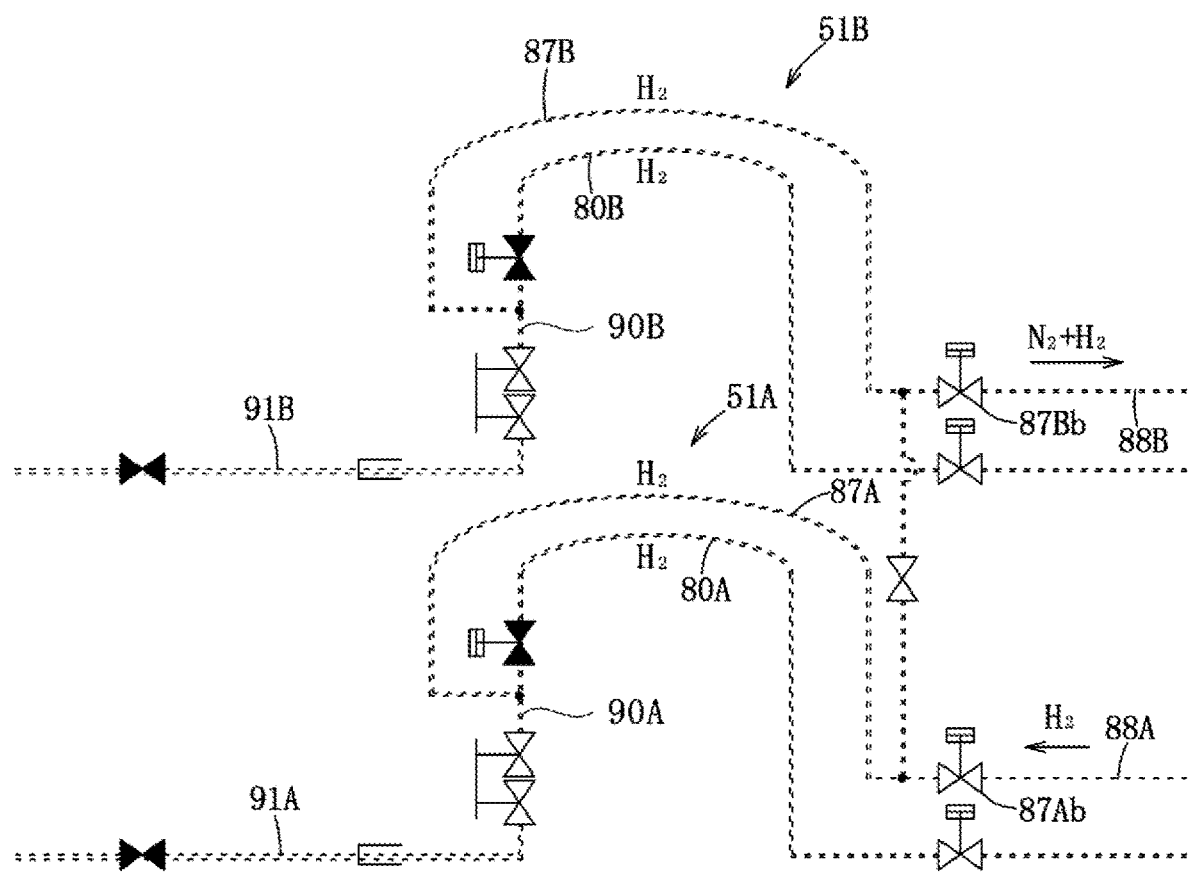

Subsequently, in the third step, as shown in FIG. 16, nitrogen gas in the piggyback lines 87A and 87B, the vacuum insulation double connecting tubes 90A and 90B, the liquefied hydrogen tubing 91A, and the hydrogen gas tubing 91B is replaced with hydrogen gas. When this nitrogen gas/hydrogen gas replacement is to be performed, while the opening/closing valve 87Ab is open and the opening/closing valve 87Bb is closed, nitrogen gas is supplied from the gas tubing 88A to set a pressurized state. The opening/closing valve 87Ab is then closed, and the opening/closing valve 87Bb is open to set a depressurized state. The above nitrogen gas/hydrogen gas replacement is thus performed based on a pressure swing scheme of repeating the above operation a plurality of number of times.

Note, however, that hydrogen gas may be supplied through the second loading arm 51B, and nitrogen gas and hydrogen gas may be taken in to the land through the first loading arm 51A.

Figure 17:
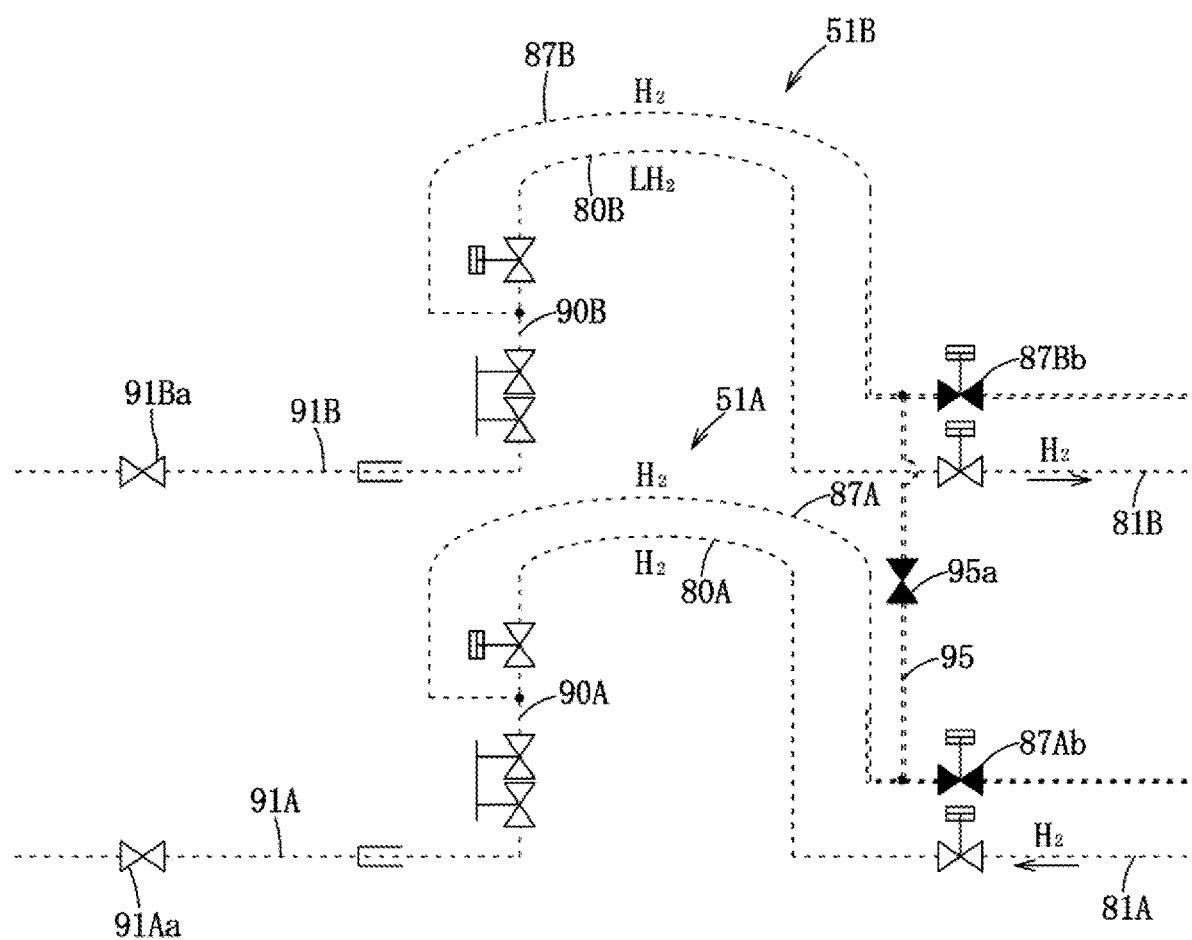

Pre-cooling is then performed as shown in FIG. 17.

In this case, when the opening/closing valve 95a is closed and low-temperature hydrogen gas is supplied from the liquefied hydrogen tubing 81A, low-temperature hydrogen gas flows from the low-temperature tank in the transport ship 2 to the hydrogen gas tubing 91B, the vacuum insulation double connecting tube 90B, and the vacuum insulation double tube 80B. As a consequence, the hydrogen gas in the piggyback lines 87A and 87B has a low temperature. Note, however, that low-temperature hydrogen gas may be supplied through the second loading arm 51B.

Figure 18:
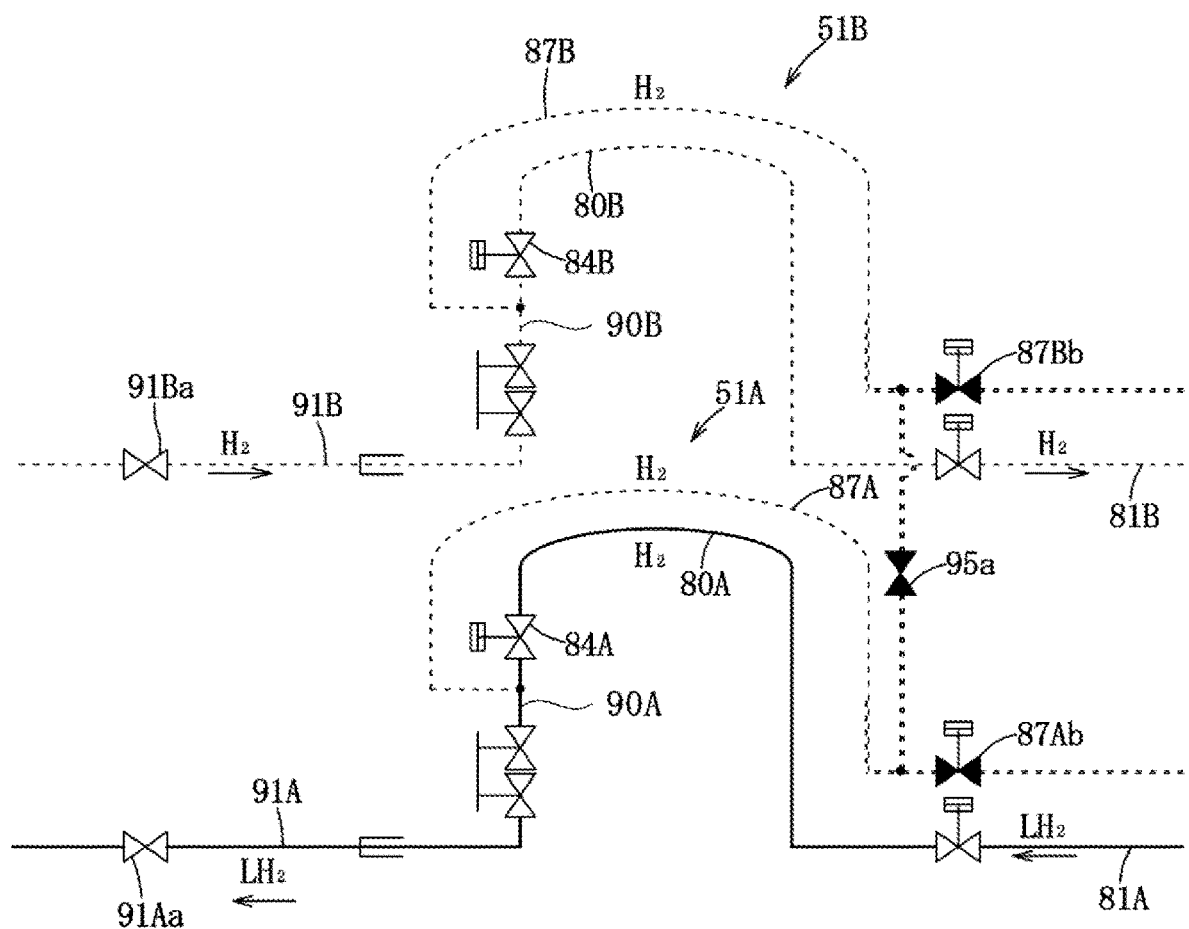

In the fourth step, as shown in FIG. 18, liquefied hydrogen is transported from the low-temperature tank on the land to the low-temperature tank in the transport ship. In this case, the opening/closing valve 95a is closed, and liquefied hydrogen is transported from the liquefied hydrogen tubing 81A to the low-temperature tank in the transport ship through the vacuum insulation double tube 80A and the liquefied hydrogen tubing 91A. At this time, low-temperature hydrogen gas flows to the hydrogen gas tubing 91B, the vacuum insulation double connecting tube 90B, and the vacuum insulation double tube 80B, and the low-temperature hydrogen gas retains in the piggyback lines 87A and 87B.

Figure 19:
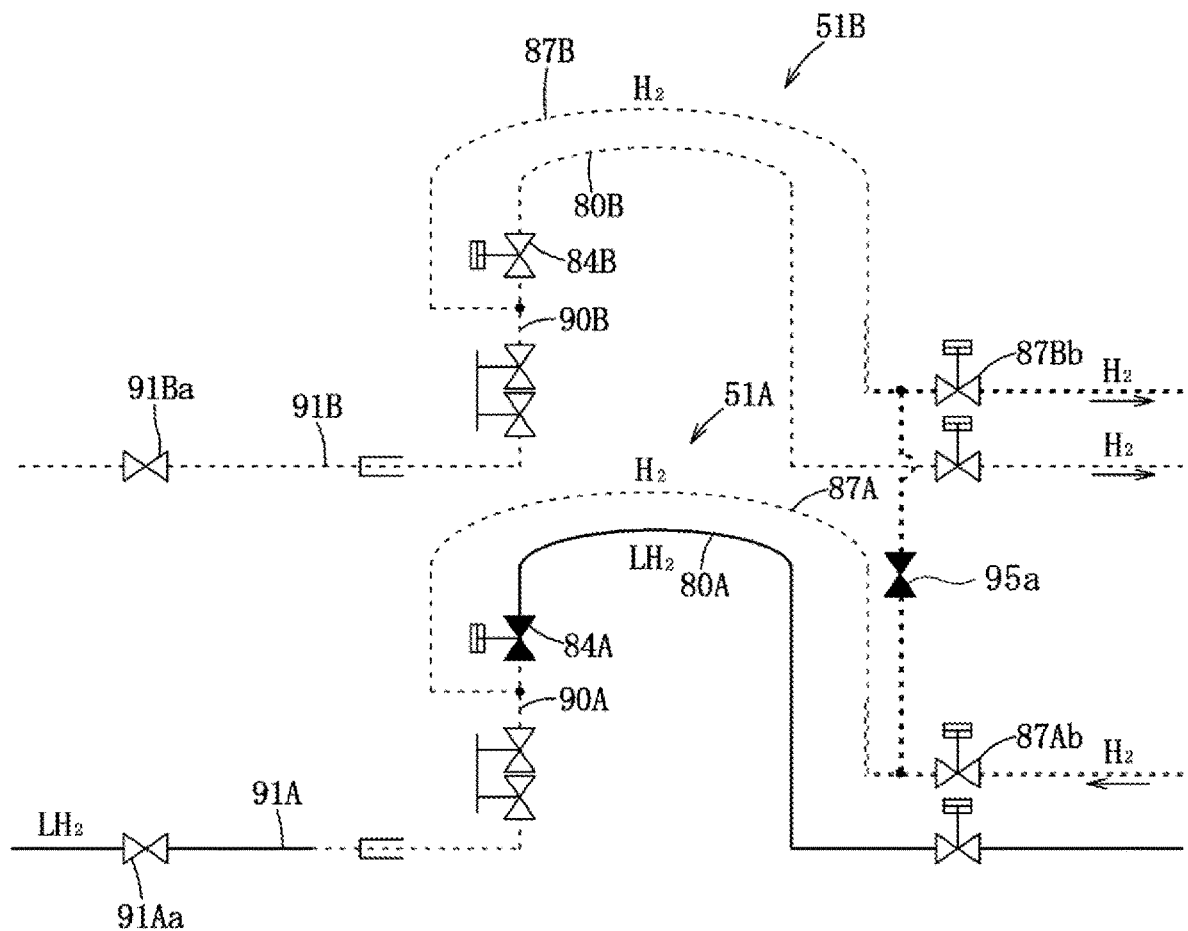

Subsequently, in the fifth step, as shown in FIG. 19, a liquid pushing operation is performed to push back liquefied hydrogen in the vacuum insulation double connecting tube 90A and the liquefied hydrogen tubing 91A to the low-temperature tank in the transport ship by using hydrogen gas supplied from the hydrogen gas supply tubing to the piggyback line 87A. In this case, when the opening/closing valve 95a is closed and hydrogen gas is supplied to the piggyback line 87A, liquefied hydrogen in the vacuum insulation double connecting tube 90A and the liquefied hydrogen tubing 91A is pushed back to the low-temperature tank in the transport ship, and hydrogen gas flows from the low-temperature tank in the transport ship to the hydrogen gas tubing 91B, the vacuum insulation double connecting tube 90B, and the piggyback line 87B.

Figure 20:
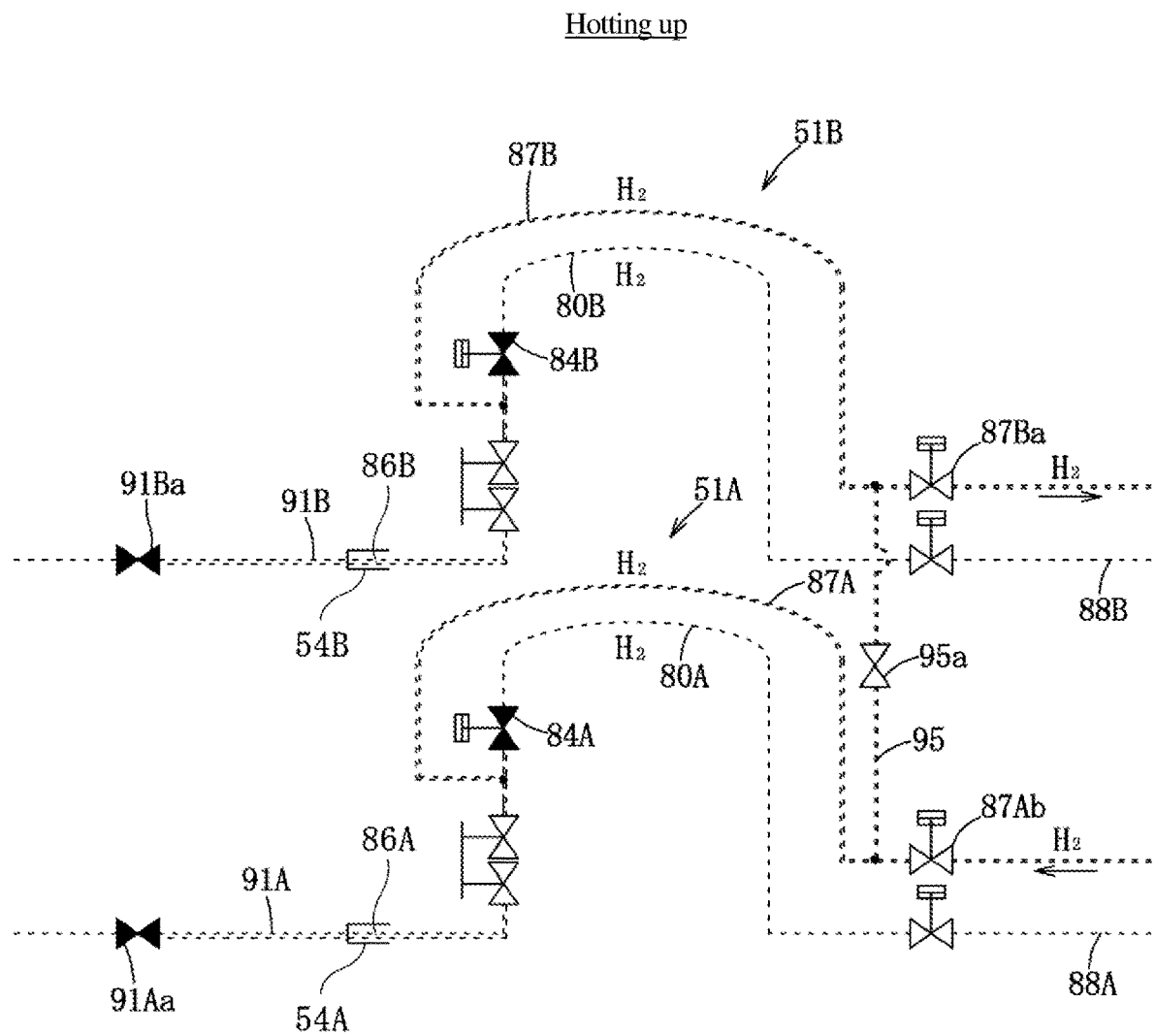

In the sixth step, as shown in FIG. 20, hotting up is performed to raise the temperatures of the bayonet joints (54A, 86A; 54B, 86B). In this case, while the opening/closing valve 87Ab is open and the opening/closing valve 87Bb is closed, hot hydrogen gas is supplied from the gas tubing 88A to set a pressurized state. Thereafter, while the opening/closing valve 87Ab is closed and the opening/closing valve 87Bb is open, depressurization is performed. By performing a pressure swing scheme of repeating the above operation a plurality of number of times, the temperatures of the piggyback lines 87A and 87B, the vacuum insulation double connecting tubes 90A and 90B, the liquefied hydrogen tubing 91A, and the hydrogen gas tubing 91B are raised.

Figure 21:
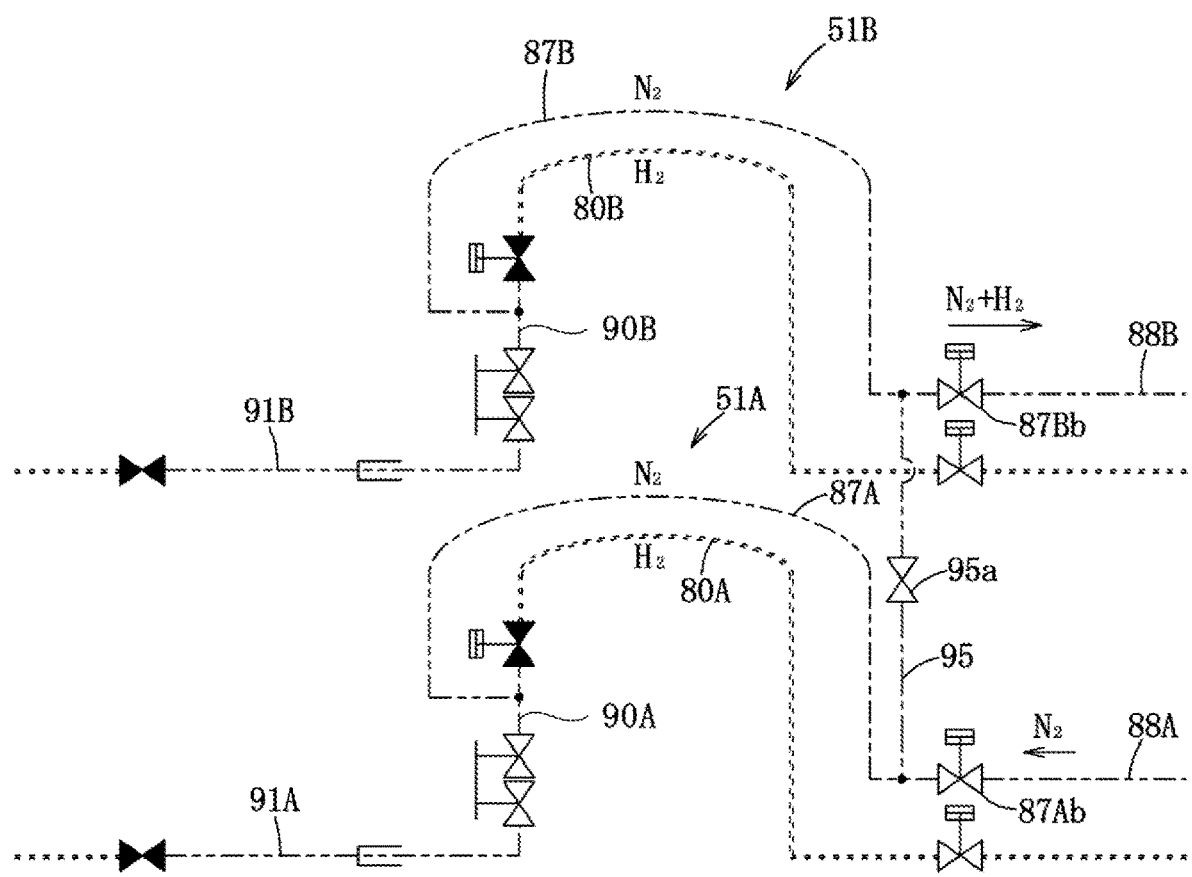

In the seventh step, as shown in FIG. 21, hydrogen gas/nitrogen gas replacement is performed to replace hydrogen gas in the piggyback lines 87A and 87B, vacuum insulation double connecting tubes 90A and 90B, the liquefied hydrogen tubing 91A, the hydrogen gas tubing 91B, and the connecting tubing 95 with nitrogen gas.

In this case, while the opening/closing valve 87Ab is open and the opening/closing valve 87Bb is closed, nitrogen gas is supplied from the gas tubing 88A to set a pressurized state. Thereafter, while the opening/closing valve 87Ab is closed and the opening/closing valve 87Bb is open, depressurization is performed. By performing a pressure swing scheme of repeating the above operation a plurality of number of times, hydrogen gas/nitrogen gas replacement is performed.

Figure 22:
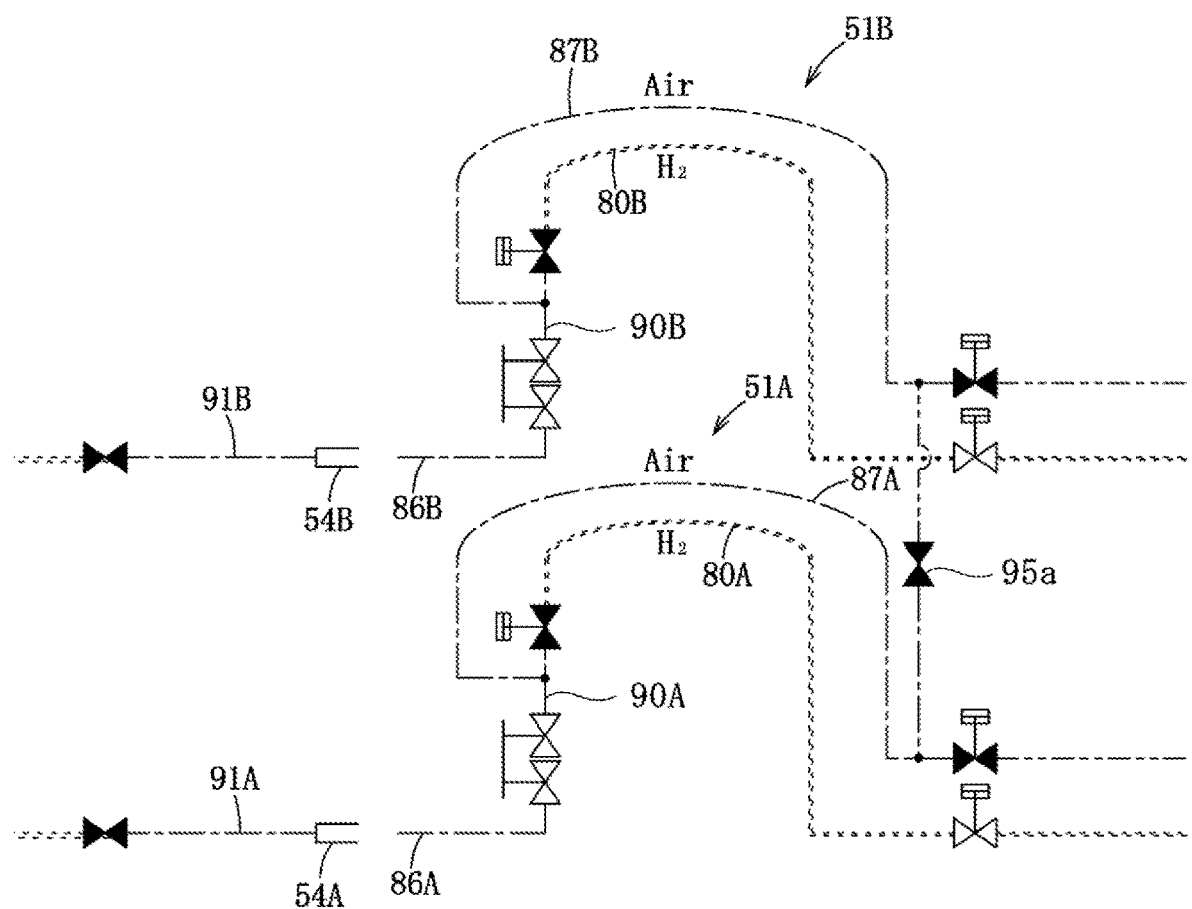

In the eighth step, as shown in FIG. 22, the opening/closing valve 95a is closed, and the bayonet joints (54A, 86A; 54B, 86B) are separated. As a result, air enters the piggyback lines 87A and 87B and the vacuum insulation double connecting tubes 90A and 90B.

The function and effect of the above liquefied hydrogen transport method are almost the same as those of the liquefied hydrogen transport method according to the first embodiment, and hence a description of them will be omitted.

An example of partially changing the above embodiment will be described next.

1) The support frame structure 10 is an example, and various types of support frame structures other than the support frame structure 10 can be used.

2) An interlocking mechanism may be provided, in place of the second fluid pressure cylinder 29, which causes the outboard boom 15 to incline in conjunction with the inclining operation of the inboard boom 12. In this case, when the inboard boom 12 inclines counterclockwise in FIG. 2, the outboard boom 15 inclines clockwise.

3) The first or second fluid pressure cylinders 28 and 29 may be omitted, and the inboard boom 12 may be manually inclined or the opening angle A between the inboard boom 12 and the outboard boom 15 may be changed.

4) The above liquefied hydrogen transport method has been described with reference to the case in which liquefied hydrogen is transported from the low-temperature tank on the land to a low-temperature tank in the liquefied hydrogen transport ship 2. However, in cargo handling shown in FIG. 8, it is also possible to transport liquefied hydrogen from the low-temperature tank in the transport ship 2 to the low-temperature tank on the land and transport hydrogen gas from the low-temperature tank on the land to the low-temperature tank in the transport ship 2 as described above.

5) When liquefied hydrogen is to be transported from a plurality of low-temperature tanks in the liquefied hydrogen transport ship 2 to a low-temperature tank on the land, it is possible to transport liquefied hydrogen through a plurality of loading arms 1 and transport hydrogen gas in a direction opposite to the above direction through one loading arm 1.

6) Further, a skilled person can realize embodiments including various modifications made to the above embodiments within the scope of the present invention, and the present invention includes such modified embodiments.

REFERENCE SIGNS LIST 1, 1A, 1B 51A, 51B liquefied hydrogen loading arm
10 support frame structure
11 base riser
12 inboard boom 15 outboard boom
15a extended member
16 counterweight
27 mount base
28 first fluid pressure cylinder
29 second fluid pressure cylinder
30, 30A, 30B, 80A, 80B vacuum insulation double tube
34, 34A, 34B, 84A, 84B arm-side opening/closing valve
37, 37A, 37B, 87A, 87B piggyback line
37Ab, 37Bb land-side opening/closing valve
45a inactive gas supply tubing
45b hydrogen gas tubing
95 connecting tubing
95a opening/closing valve

The invention claimed is:

1. A liquefied hydrogen loading arm configured to transport liquefied hydrogen, the loading arm comprising:
a loading arm support frame structure including a base riser configured to be erected on land, an inboard boom, an outboard boom, and a counterweight attached to a proximal end of the inboard boom;
a flexible vacuum insulation double tube including a metal inner tube, a metal outer tube, and an insulation vacuum layer, the flexible vacuum insulation double tube being disposed in a space below the support frame structure and supported by the support frame structure;
a vacuum insulation double connecting tube connected to a distal end of the vacuum insulation double tube and to a distal end of the outboard boom;
an arm-side opening/closing valve and an emergency release system sequentially interposed in the vacuum insulation double connecting tube from a vacuum insulation double tube side; and
a flexible piggyback line disposed along the vacuum insulation double tube, the flexible piggyback line including:
a proximal end configured to be selectively connected to an inactive gas tubing and a hydrogen gas tubing on land through a land-side opening/closing valve, and
a distal end connected to the vacuum insulation double connecting tube between the arm-side opening/closing valve and the emergency release system.

2. A liquefied hydrogen transport method of transporting liquefied hydrogen with at least two liquefied hydrogen loading arms according to claim 1, the at least two liquefied hydrogen loading arms being disposed adjacent to each other and the at least two liquefied hydrogen loading arms being configured to be either (i) connected to each other through a manifold of a liquefied hydrogen transport ship while being connected to the manifold, or (ii) cut off from each other while being connected to the manifold, the method comprising:
connecting the at least two liquefied hydrogen loading arms to the manifold while a plurality of vacuum insulation double tubes of the at least two liquefied hydrogen loading arms are filled with hydrogen gas and air is mixed in a plurality of piggyback lines;
supplying the inactive gas to a first piggyback line of the plurality of piggyback lines of the at least two liquefied hydrogen loading arms and supplying a gas mixture of the inactive gas and air to a second piggyback line of the plurality of piggyback lines of the at least two liquefied hydrogen loading arms;
supplying hydrogen gas to the first piggyback line of the plurality of piggyback lines and supplying a gas mixture of hydrogen gas and the inactive gas to the second piggyback line of the plurality of piggyback lines; and
transporting liquefied hydrogen through a vacuum insulation double tube of the plurality of vacuum insulation double tubes of the at least two liquefied hydrogen loading arms.

3. The liquefied hydrogen transport method according to claim 2, further comprising, upon having transported liquefied hydrogen through the vacuum insulation double tube of the plurality of vacuum insulation double tubes, receiving liquefied hydrogen and hydrogen gas through the plurality of vacuum insulation double tubes of the at least two liquefied hydrogen loading arms while supplying hydrogen gas to one of the piggyback lines of the at least two liquefied hydrogen loading arms.

4. The liquefied hydrogen transport method according to claim 3, further comprising, upon having received liquefied hydrogen and hydrogen gas through the plurality of vacuum insulation double tubes:
supplying the inactive gas to the first piggyback line of the plurality of piggyback lines,
supplying hydrogen gas and the inactive gas to the second piggyback line of the plurality of piggyback lines, and
replacing a gas in the plurality of piggyback lines with the inactive gas.

5. The liquefied hydrogen transport method according to claim 4, further comprising, upon having replaced the gas in the plurality of piggyback lines with the inactive gas, separating the liquefied hydrogen loading arms from the manifold and mixing air in the plurality of piggyback lines while the plurality of vacuum insulation double tubes of the liquefied hydrogen loading arms are filled with hydrogen gas.

6. A liquefied hydrogen transport method of transporting liquefied hydrogen with at least two liquefied hydrogen loading arms according to claim 1, the at least two liquefied hydrogen loading arms being disposed adjacent to each other and the at least two liquefied hydrogen loading arms having a plurality of piggyback lines configured to be either (i) connected to a connecting tubing provided on land through an opening/closing valve interposed in the connecting tubing, or (ii) cut off from the connecting tubing, the method comprising:
connecting the liquefied hydrogen loading arms to the connecting tubing while a plurality of vacuum insulation double tubes of the liquefied hydrogen loading arms are filled with hydrogen gas and air is mixed in the plurality of piggyback lines;
supplying the inactive gas to a first piggyback line of the plurality of piggyback lines of the at least two liquefied hydrogen loading arms and supplying a gas mixture of the inactive gas and air to a second piggyback line of the plurality of piggyback lines of the liquefied hydrogen loading arms;
supplying hydrogen gas from a first piggyback line of the plurality of piggyback lines of the liquefied hydrogen loading arms and supplying a gas mixture of hydrogen gas and the inactive gas to the second piggyback line of the plurality of piggyback lines of the liquefied hydrogen loading arms; and
transporting liquefied hydrogen through a vacuum insulation double tube of the plurality of vacuum insulation double tubes of the liquefied hydrogen loading arms.

* * * * *